United States Patent
Qi et al.

(10) Patent No.: US 12,515,602 B2
(45) Date of Patent: Jan. 6, 2026

(54) METHODS AND SYSTEMS OF PREDICTING TOTAL LOSS EVENTS

(71) Applicant: CAMBRIDGE MOBILE TELEMATICS INC., Cambridge, MA (US)

(72) Inventors: Yuting Qi, Lexington, MA (US); Cornelius Young, Needham, MA (US); Rizki Syarif, Lexington, MA (US); Burak Erem, Lexington, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 948 days.

(21) Appl. No.: 17/374,684

(22) Filed: Jul. 13, 2021

(65) Prior Publication Data

US 2022/0017032 A1   Jan. 20, 2022

Related U.S. Application Data

(60) Provisional application No. 63/051,727, filed on Jul. 14, 2020.

(51) Int. Cl.
  B60R 21/013   (2006.01)
  G06N 5/04   (2023.01)
  (Continued)

(52) U.S. Cl.
  CPC ............. B60R 21/013 (2013.01); G06N 5/04 (2013.01); G06N 20/00 (2019.01);
  (Continued)

(58) Field of Classification Search
  CPC .... G06Q 30/0278; G06Q 40/08; G06Q 10/20; G07C 5/008
  See application file for complete search history.

(56) References Cited

U.S. PATENT DOCUMENTS 8,364,505 B1   1/2013   Kane et al.
9,773,281 B1 *  9/2017   Hanson ................. H04W 4/023
(Continued)

FOREIGN PATENT DOCUMENTS

EP   3744601 B1   4/2024
EP   3507787 B1   8/2024
(Continued)

OTHER PUBLICATIONS

EP21842959.5, "Extended European Search Report", Jun. 19, 2024, 9 pages.
(Continued)

Primary Examiner — Kamran Afshar
Assistant Examiner — Steven Phung
(74) Attorney, Agent, or Firm — Kilpatrick Townsend & Stockton LLP

(57) ABSTRACT

A mobile device detects a crash event using one or more sensors of a mobile device. The mobile device records a first set of data from the one or more sensors of the mobile device. The mobile device generates a first feature vector including the first set of data and vehicle data that includes an identifier of a vehicle. The mobile device generates a second feature vector using the first set of data and additional data types. The mobile device predicts a confidence of a total loss event by generating a first confidence value from a first machine-learning model using the first feature vector and a second confidence value from a second machine-learning model using the second feature vector.

17 Claims, 10 Drawing Sheets

(51) Int. Cl.
*G06N 20/00* (2019.01)
*G06Q 10/20* (2023.01)
*G06Q 30/02* (2023.01)
*G06Q 40/08* (2012.01)
*G07C 5/00* (2006.01)
*H04W 4/38* (2018.01)
*H04W 4/40* (2018.01)
*H04W 4/48* (2018.01)

(52) U.S. Cl.
CPC ......... *G06Q 30/0278* (2013.01); *G06Q 40/08* (2013.01); *G07C 5/008* (2013.01); *H04W 4/40* (2018.02); *G06Q 10/20* (2013.01)

(56) References Cited

U.S. PATENT DOCUMENTS

| | | | |
|---|---|---|---|
| 11,403,267 B2* | 8/2022 | Medisetti | G06F 16/215 |
| 2014/0304197 A1 | 10/2014 | Jaiswal et al. | |
| 2015/0300827 A1 | 10/2015 | Malalur et al. | |
| 2016/0094964 A1* | 3/2016 | Barfield, Jr. | H04W 4/90 340/870.07 |
| 2016/0321923 A1 | 11/2016 | Seo | |
| 2017/0053461 A1* | 2/2017 | Pal | G08G 1/012 |
| 2018/0300815 A1* | 10/2018 | Collins | G06Q 30/0278 |
| 2020/0410784 A1* | 12/2020 | Agrawal | G07C 5/008 |

FOREIGN PATENT DOCUMENTS

| | | |
|---|---|---|
| EP | 4005252 B1 | 1/2025 |
| EP | 3588373 B1 | 6/2025 |
| JP | 2002145046 A | 5/2002 |
| JP | 2014114008 A | 6/2014 |
| WO | 2019097245 A1 | 5/2019 |

OTHER PUBLICATIONS

Zualkernan, et al., "Intelligent Accident Detection Classification using Mobile Phones", 2018 International Conference on Information Networking (ICOIN), Jan. 10, 2018, pp. 504-509.
PCT/US2021/041659, "International Search Report and Written Opinion", Oct. 21, 2021, 11 pages.
White, et al., "Wreckwatch: Automatic Traffic Accident Detection and Notification with Smartphones", Mobile Networks and Applications, vol. 16, No. 3, Mar. 22, 2011, pp. 285-303.
PCT/US2021/041659, "International Preliminary Report on Patentability", Jan. 26, 2023, 10 pages.
JP2023-501761, "Office Action", Jun. 24, 2025, 12 pages.
JP2023-501761, "Notice of Allowance", Oct. 14, 2025, 3 pages.

* cited by examiner

|  |  | Inputs | | | Performance | |
| --- | --- | --- | --- | --- | --- | --- |
| | Models | Mobile Sensors | Vehicle Data | Airbag Data | Recall | Precision |
| 910 | Vehicle Make, Model, and Year Only | N | Y | N | 50% | 63% |
| 912 | Sensor Data Only | Y | N | N | 50% | 70% |
| 914 | Sensor Data and Vehicle Make, Model, and Year | Y | Y | N | 50% | 80% |
| 916 | Sensor Data and Airbag Data | Y | N | Y | 50% | 88% |
| 918 | Vehicle Make, Model, and Year, and Airbag Data | N | Y | Y | 55% | 88% |
| 920 | Sensor Data, Vehicle Make, Model and Year, and Airbag Data | Y | Y | Y | 55% | 92% |

FIG. 9

METHODS AND SYSTEMS OF PREDICTING TOTAL LOSS EVENTS

CROSS-REFERENCE TO RELATED APPLICATION

This application claims priority to U.S. Provisional Patent Application No. 63/051,727, filed on Jul. 14, 2020, entitled "Methods and Systems of Predicting Total Loss Events," the disclosure of which is hereby incorporated by reference in its entirety for all purposes.

BACKGROUND OF THE INVENTION

Modern mobile devices include a number of sensors operable to measure characteristics of an environment of the mobile device. Despite the progress made in the area of using mobile devices to predict outcomes of events detected by the sensors of the mobile device, there is a need in the art for improved methods and systems related to predicting outcomes of events.

SUMMARY OF THE INVENTION

Embodiments of the present invention generally relate to predicting a total loss event, and more particularly, to detecting a crash event and predicting a confidence of a total loss event associated with the crash event.

According to an embodiment of the present invention, a method of predicting a confidence of a total loss event is provided. A mobile device can detect a crash event using one or more sensors. The mobile device records a first set of data from the one or more sensors. The mobile device associates the first set of data with the detected crash event. The mobile device generates a first feature vector including the first set of data and vehicle data that includes an identifier of a vehicle. The mobile device generates a second feature vector using the first set of data including one or more additional data types. The mobile device can predict a confidence of a total loss event by generating a first confidence value from a first machine-learning model using the first feature vector and generating a second confidence value from a second machine-learning model using the second feature vector.

Another aspect of the present invention includes a system comprising one or more processors and a non-transitory computer-readable medium storing instructions, which when executed by the one or more processors, cause the one or more processors to perform the method described above.

Another aspect of the present disclosure includes a non-transitory, computer-readable medium storing instructions, which when executed by the one or more processors, cause the one or more processors to perform the method described above.

Numerous benefits are achieved by way of the present invention over conventional techniques. For example, embodiments of the present invention provide real-time processing of sensor data during drives. The real-time processing enables a determination of a magnitude of a loss event at, or soon after, detection of the loss event. In addition, the real-time processing of the sensor data by the mobile device may enable detection of various driving events such as, but not limited to a loss event (e.g., a crash, mechanical failure, or the like).

Further areas of applicability of the present invention will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

FIG. 9 is a table of results for predicting total loss events on confirmed crashes generated by a machine-learning model according to some embodiments.

DETAILED DESCRIPTION OF SPECIFIC EMBODIMENTS

Embodiments of the present invention generally relate to predicting a total loss event, and more particularly, to detecting a crash event and predicting a confidence of a total loss event associated with the crash event.

Embodiments of the present invention enable predicting a total loss event based on detecting a crash event, such as a vehicle collision, during a drive. An application executing on a mobile device uses an application programming interface (API) to access measurements of the sensors of the mobile device. The application analyzes the measurements to detect a crash event. The application then identifies a portion of measurements that represent movements of the vehicle during the crash event. The application can predict whether the crash event corresponds to a total loss event based on analysis of the portion of the measurements that represent the crash event.

In some instances, the application may predict a confidence of the total loss event using machine learning and contextual or vehicle data to improve the accuracy of the prediction. The application may generate the confidence of the total loss event in real time, for example, approximately immediately following detection of the crash event. The application can use multiple machine-learning models selected for the specific data available at the time of the crash. For example, the application may use a first machine-learning model during a crash event that can be characterized by sensor information and includes vehicle data that can be used to identify the vehicle (e.g., make, model, year, etc.). In another example, the application may use a second machine-learning model during a crash event that can be characterized by sensor information and includes additional data types that can be used to identify other characteristics of the crash event (e.g., an airbag activation data type, fluid leakage indicator, structural damage, etc.).

As used herein, "total loss event" means that a vehicle has sustained a damage level that is greater than a value of the vehicle.

As used herein, "immediately following" means approximately following an instant of time in which a crash event is detected (e.g., within 1 second, within 1 minute, upon a predetermined time interval after detection of sensor measurements that are below a threshold value, or the like). For example, the processes described herein may be performed immediately following detection of a crash event, such as a vehicle collision, relating to a vehicle.

Figure 1:
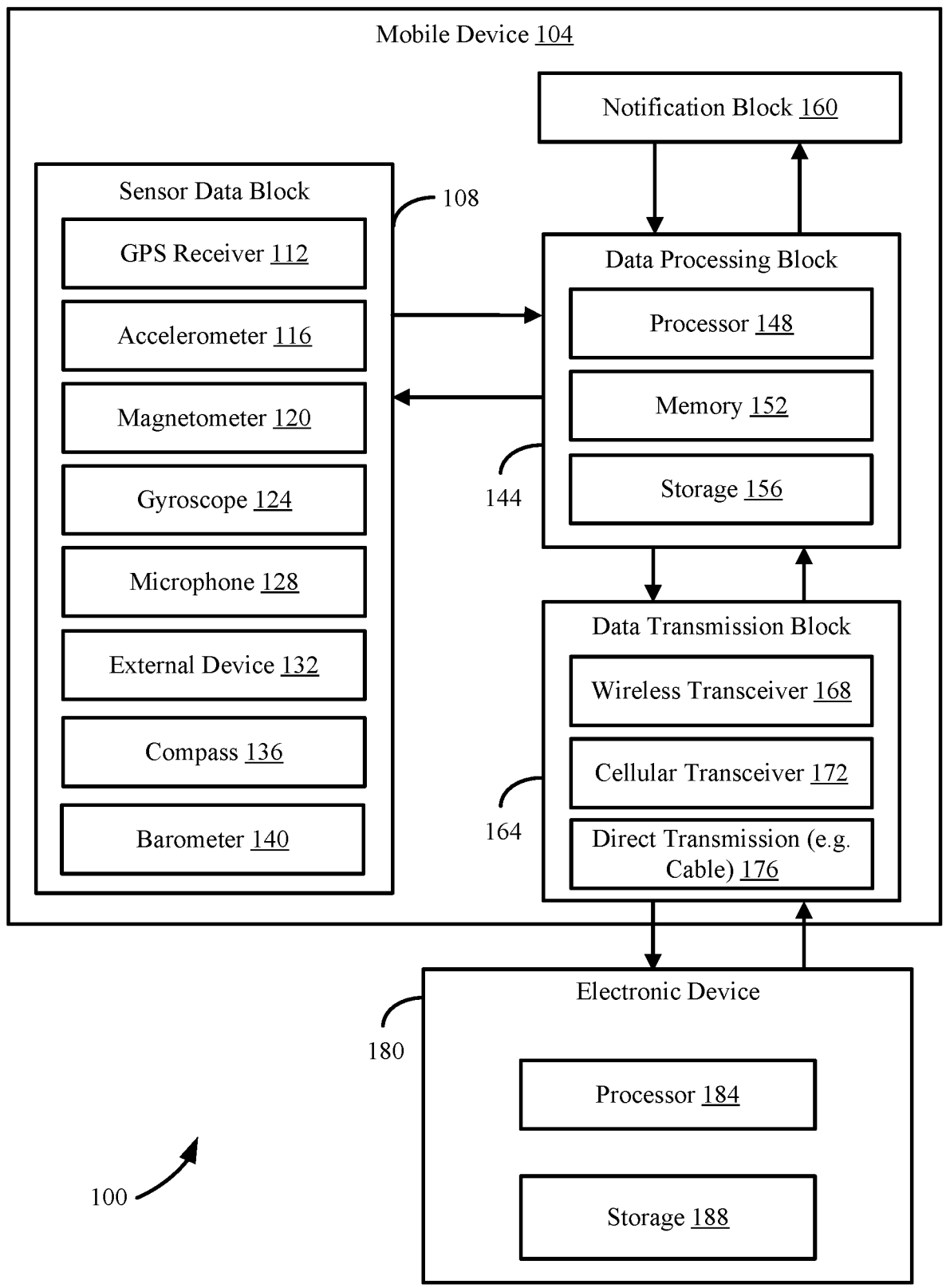
FIG. 1 is an exemplary block diagram illustrating the sensor and processing components of a mobile device for predicting a total loss event according to some embodiments.

FIG. 1 is an exemplary block diagram illustrating the sensor and processing components of a mobile device for predicting a total loss event according to some embodiments. System 100 includes a mobile device 104 that includes a plurality of processing, sensor, and communication resource components. Mobile device 104 may include a sensor data block 108, a data processing block 144, a data transmission block 164, and optionally a notification block 160. The sensor data block 108 includes data collection sensors as well as the data collected from sensors that is available to mobile device 104. The sensor data block 108 can include an external device 132 connected via Bluetooth, universal serial bus (USB) cable, etc. The data processing block 144 may include storage 156 that may include data collected by the sensors of the sensor data block 108 processed by processor 148. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may process communications (e.g., transmitted and received communications) such as the processed sensor data transmitted to an external computing device (e.g., electronic device 180). The external computing device may also store and/or process the data obtained from sensor data block 108. In some examples, the electronic device 180 may include its own processor 184 and storage 188.

Notification block 160 may report the results of analysis of sensor data performed by the data processing block 144 to a user of the mobile device 104 via a display (not shown). For example, notification block 160 may display or otherwise present a warning communication to a user of the mobile device 104 upon determining that that the user has experienced a predicted total loss event. In some examples, the predicted total loss event determination may be a process executed by processor 148 of mobile device 104. In other examples, the predicted total loss event determination may be a process executed by processor 184.

In some examples, driving data may be collected using mobile device 104. These examples are not limited to any particular electronic device. As an example, a variety of electronic devices including sensors such as location determination systems such as global positioning system (GPS) receivers 112, accelerometers 116, magnetometers 120, gyroscopes 124, microphones 128, external device 132, compasses 136, barometers 140, communications capabilities, and the like may be included or connected to mobile device 104. Examples of mobile device 104 include smart watches, fitness monitors, Bluetooth headsets, tablets, laptop computers, smart phones, music players, movement analysis devices, and the like.

One or more sensors of mobile device 104 (e.g., the sensors of sensor data block 108) may be operated to collect measurements to provide an indication as to physical interaction with the mobile device 104. In some examples, the measurements may be collected at time when mobile device 104 is likely to be with the driver when operating a vehicle, such as when the device is moving with a particular speed or when the device is located on a known road (e.g., a highway). The sensors used to collect data may be components of the mobile device 104, and use power resources available to mobile device 104 components, e.g., mobile device battery power and/or a data source external to mobile device 104.

In some examples, settings of a mobile device may be used to enable different functions described herein. For example, an operating system (OS), such as Apple® IOS, Android® OS, and/or a wearable device operating system having certain settings enabled can enable certain functions of embodiments. In some examples, having location services enabled allows the collection of location information from the mobile device (e.g., collected by global positioning system (GPS) receiver 112), and enabling background application refresh allows some embodiments to execute in the background, collecting and analyzing driving data even when the application is not executing. In some implementations, alerts are provided or surfaced using notification block 160 while the app is running in the background since various processing and data collection can be performed in the background.

Figure 2:
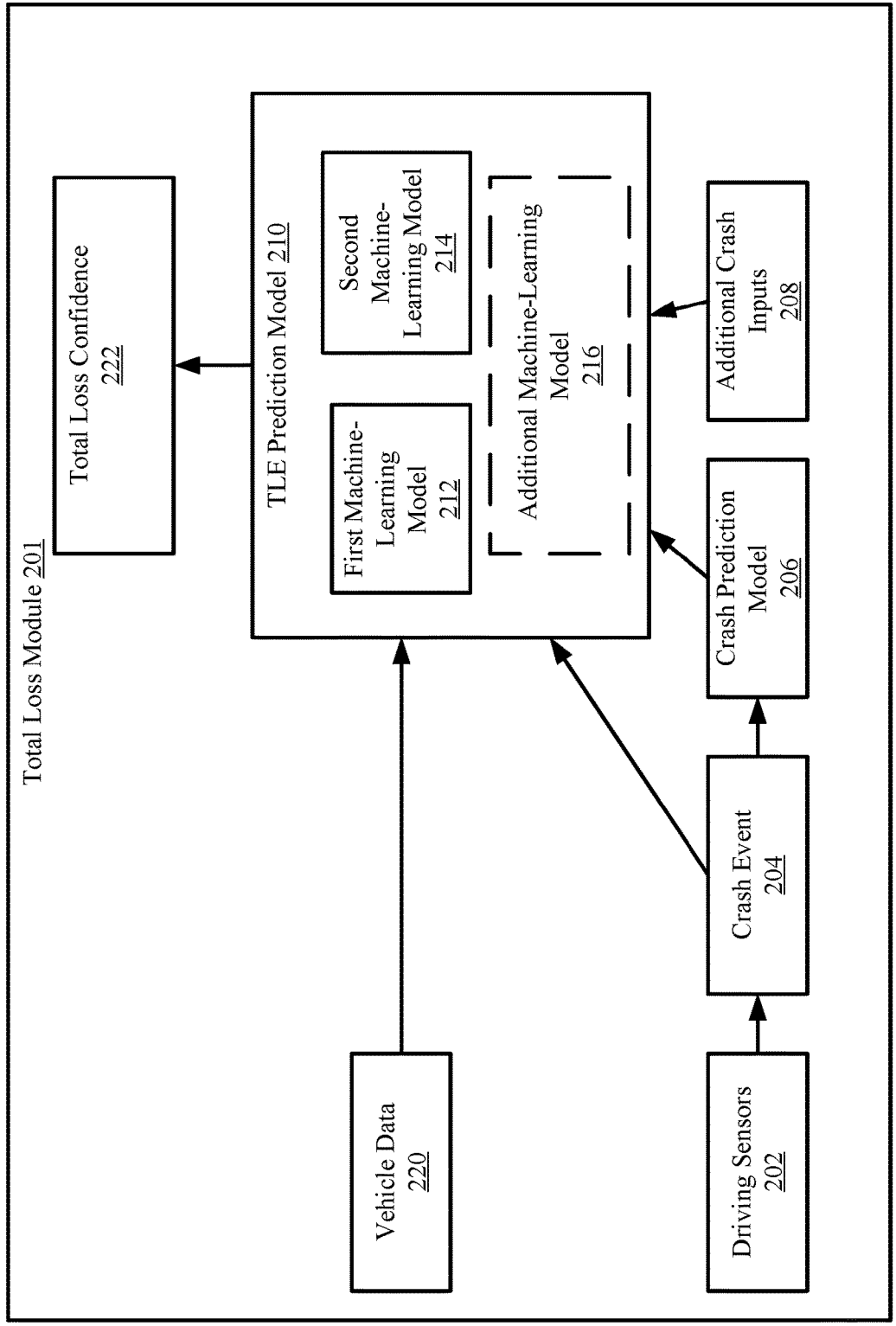
FIG. 2 is a block diagram of a software environment for predicting total loss events according to some embodiments.

FIG. 2 is a block diagram of a software environment 200 for predicting total loss events according to some embodiments. In various embodiments, total loss module 201 is a software application that provides a prediction of a total loss event by generating total loss confidence 222. Total loss module 201 may be executed by data processing block 144 of mobile device 104. Total loss module 201 may receive inputs from various driving sensors 202 and additional data types (e.g., an airbag activation data type) from internal and external sources that can be used to predict a total loss event (TLE) by TLE prediction model 210. For instance, TLE prediction model 210 may generate a prediction of a total loss event that may be based on vehicle data 220, crash event 204, an output of crash prediction model 206, and additional crash inputs 208.

Total loss module 201 obtains input from driving sensors 202. Driving sensors 202 may include, but are not limited to, sensors that are included in sensor data block 108 of mobile device 104. Driving sensors 202 can additionally include external sensors, the measurements from which may be transmitted to mobile device 104. Examples of external sensors include sensors indicating fluid leaks (e.g., transmission fluid, brake fluid, oil, etc.) sensors indicating mechanical failures (e.g., structural transmission damage, wheel position/coupling, torque or shaft stresses, etc.), sensors from another mobile device (e.g., of a similar type as mobile device 104), sensors embedded into the vehicle (e.g., the telematics unit of the vehicle), sensors embedded into or associated with another vehicle (e.g., another vehicle involved in the crash event), combinations thereof, and the like. In some cases, driving sensors 202 may provide continuous monitoring of vehicle movements to total loss module 201. In other cases, each individual sensor of driving sensors 202 may provide monitoring at a measurement rate specified by total loss module 201. For instance, total loss module 201 may prescribe specific sensors of driving sensors 202 to operate at defined rates based on environmental conditions, a length of a driving trip, a vehicle type/model, a particular driver, or the like.

Total loss module 201 may detect crash event 204 during a drive, or at another time during operation of the vehicle. Total loss module 201 may detect crash event 204 based on information from driving sensors 202. For instance, total loss module 201 may detect high magnitude accelerometer measurements, abrupt velocity changes, or other measurements using the information from driving sensors 202 that correspond to indicators that crash event 204 has occurred. In some cases, total loss module 201 may determine that crash event 204 has occurred due to a mechanical, electrical, or structural failure of the vehicle that is not associated with a collision-type crash event using, for example, a magnetometer, a microphone, or the like.

For example, the accelerometer sensor may detect a sudden increase in magnitude in an opposing direction from the direction of travel of the vehicle. The total loss module 201 may determine that the vehicle was involved in a collision that caused a sudden reduction in acceleration. A magnetometer may detect a sudden change in the magnetic field characteristics, such as a sudden stop in rotating metal elements of the vehicle (e.g., transmission, shaft, axles, etc.) The total loss module 201 may also determine that a mechanical failure has occurred based on the change in magnetometer.

Total loss module 201 can detect a broad range of movements due to the mobile device having a reference frame that may be different from a reference from of the vehicle. Since mobile device 104 may not be fixed to the vehicle, the acceleration measurements may be different for mobile device 104 than the vehicle telematics system. As an example, in contrast with an accelerometer mounted in the vehicle, during an accident (e.g., a vehicle collision) in which the mobile device is lying on the seat, the deceleration for the mobile device can lag the deceleration of the vehicle since the mobile device may move within the vehicle semi-independently from the movement of the vehicle. Mobile device 104 may define a transform that maps the accelerations measured using the mobile device to the frame of reference of the vehicle. The transform may enable the reference frame of the mobile device (e.g., and the sensor measurements of the mobile device) to be converted into the reference frame of the vehicle. The transform may enable the measurements of driving sensors 202 to be used to characterize movements of the vehicle (e.g., direction of movement, breaking events, location of the vehicle, etc.)

In some instances, mobile device 104 may also use the transform to filter out sensor measurements that correspond to movement of the mobile device from sensor measurements that correspond to movement of the vehicle. For instance, using the transform, mobile device 104 may determine that a portion of an acceleration measurement was the result of independent movement of the mobile device within the vehicle. The portion of the acceleration measurement associated with the mobile device may be filtered out such that the remaining portion of the acceleration measurement characterizes the movement of the vehicle. As an example, during a hard braking event, the mobile device may slide forward before being stopped by the firewall thereby causing driving sensors 202 to detect a large acceleration (in the backwards direction) during the breaking event followed by an even larger acceleration when the mobile device hits the firewall. The transform may be used to filter the portion of the acceleration measurement associated with the mobile device to ensure that the remaining portion of the sensor measurements accurately correspond to the acceleration of the vehicle.

Total loss module 201 may identify a first set of data that includes sensor measurements from driving sensors 202 collected over a time interval that includes the crash event. In some instances, the time interval may be of a predetermined length such as beginning at a first time (e.g., one minute, five minutes, or any other time) before the crash event and a second time (e.g., one minute, five minutes, or any other time) after the crash event. In other instances, the time interval may be dynamically defined by total loss module 201 based on driving sensors 202. For instance, the time interval may begin at the first time before the crash event and end at a third time in which total loss module 201, using driving sensors 202, determines (from the sensor measurements) that the vehicle has come to a rest (e.g., to ensure that the time interval includes the entire crash event). The total loss module 201 may select the third time data based on a threshold value of sensor input magnitude (e.g., a threshold acceleration magnitude, an indication that GPS position measurements are not changing or are within a threshold variation, etc.). In some cases, TLE prediction model 210 may transmit the first set of data to electronic device 180 for processing and the results may be transmitted from electronic device 180 to TLE prediction model 210.

Crash prediction model 206 determines a likelihood that the vehicle has been involved in an accident (e.g., a vehicle collision, mechanical failure, or the like). Crash prediction model 206 may be a predictive binary (or non-binary) classifier. For instance, crash prediction model 206 may derive a set of crash features from various acceleration measurements, GPS location positions, vehicle movements measured by driving sensors 202, and the like. Crash prediction model 206 may execute using the set of crash features to generate a prediction that a crash event occurred. Crash prediction model 206 can additionally output a crash feature vector that includes crash features associated with the crash event 204. The crash feature vector may be output to TLE prediction model 210.

Total loss module 201 may provide additional crash inputs 208 to TLE prediction model 210. Additional crash inputs 208 may include, but are not limited to, airbag deployment information, a fluid leakage indicator, an indication that a call was placed to emergency medical services, medical condition of a driver or a passenger (e.g., from a wearable device that collects heart-rate data, breathing data, or the like), or the like. In other examples, the additional crash inputs 208 can be responses to survey questions provided by Total Loss Module 201 to a user (e.g., such as a driver or passenger) via a user interface of mobile device 104.

Total loss module 201 may provide vehicle data 220 to TLE prediction model 210. Vehicle data 220 includes one or more data types that correspond to vehicle-specific information. Examples of the data types of vehicle data 220 include, but are not limited to, make, model, year of manufacture, trim packages (e.g., quality and features), previous accident history (e.g., a previous vehicle collision), vehicle identification number, previous insurance claims on the vehicle, vehicle maintenance records, combinations thereof, and the like. TLE prediction model 210 may use vehicle data 220 to more accurately predict a total loss event.

TLE prediction model 210 can include two or more machine-learning models to generate total loss confidence 222 of the total loss event. In FIG. 2, the TLE prediction model 210 includes a first machine-learning model 212 and a second machine-learning model 214. TLE prediction model 210 may include any number of additional machine-learning models such as additional machine-learning model 216 or other machine-learning models (not shown). TLE prediction model 210 generates a total loss confidence 222 (i.e., a likelihood of the total loss event) using one or more of the machine learning models.

The machine learning models of TLE prediction model 210 may be trained, using supervised or unsupervised learning, using data sets of particular data types. For instance, first machine-learning model 212 may be trained to generate a confidence for a first feature vector. The first feature vector may include a first set of features such as, but not limited to, vehicle features (e.g., extracted from vehicle data 220) and sensor features (e.g., extracted from sensor data from driving sensors 202). The second machine-learning model 214 may be trained to generate a confidence for a second feature vector. The second feature vector may include a second set of features such as, but not limited to, vehicle features (e.g., extracted from vehicle data 220), sensor features (e.g., extracted from sensor data from driving sensors 202), and an indication of airbag deployment. The first set of features and the second set of features may be disjoint sets as previously described or non-disjoint sets.

First machine-learning model 212, second machine-learning model 214, and additional machine-learning model 216 may be any type of machine-learning model. Examples of first machine-learning model 212 and second machine-learning model 214 may be a decision trees, neural networks, Bayesian networks, or other models. In one example, first machine-learning model 212 predicts a confidence using the first feature vector that includes the vehicle data 220 and the first set of data recorded from driving sensors 202. First machine-learning model 212 is trained using a training data set representative of the sensor data. Second machine-learning model 214 predicts a confidence using a second feature vector that includes the first set of data recorded from driving sensors 202 and additional crash inputs 208. In examples that include an additional machine-learning model 216, additional machine-learning model 216 predicts a confidence using one or more data types in addition to or in place of the data types used by first machine-learning model 212 and/or second machine-learning model 214. TLE prediction model 210 can include any number of additional machine-learning models 216, each configured to generate a respective prediction based on a different set of inputs the inputs used to by other machine-learning models of TLE prediction model 210.

TLE prediction model 210 may generate multiple confidence values using one or more machine learning models as described above. Total loss module 201 may determine a total loss confidence 222 from the confidence values for each respective machine-learning model. An example of the total loss confidence 222 may be a percentage likelihood that the crash event 204 is a total loss event.

Figure 3:
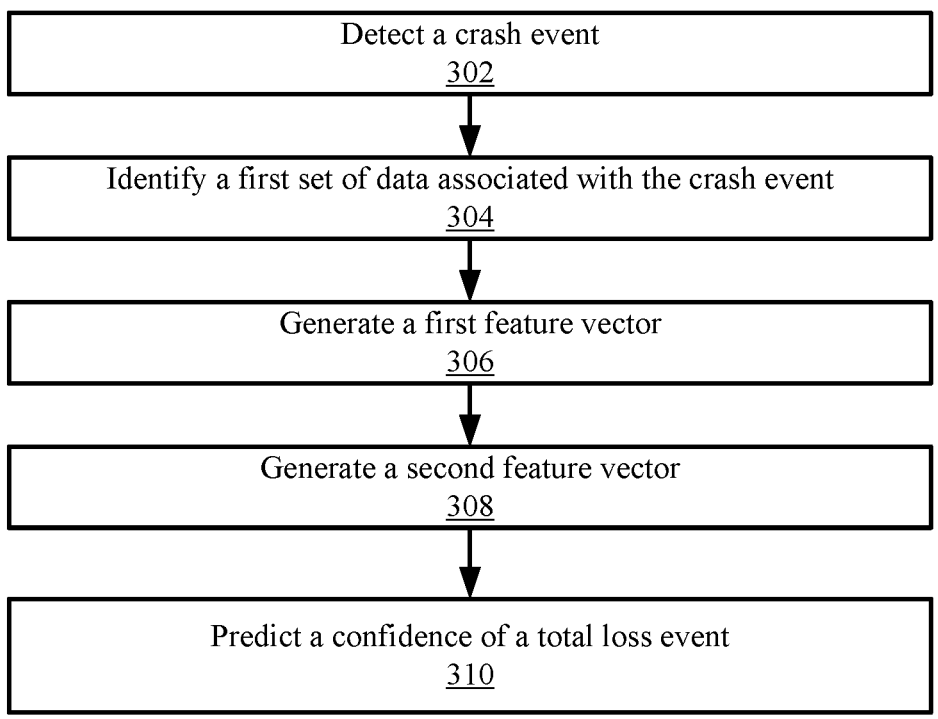
FIG. 3 is an exemplary process for predicting a confidence of a total loss event according to some embodiments.

FIG. 3 is an exemplary process 300 for predicting a confidence of a total loss event according to some embodiments. At block 302, a crash event associated with an application (e.g., such as a total loss module as previously described) of a mobile device is detected. The crash event, such as crash event 204, may be detected using one or more sensors of the mobile device (e.g., such as sensors of sensor data block 108 of mobile device 104). As a first example, the mobile device can detect a crash event by detecting changes in vehicle movement by, for example, using a GPS sensor or an accelerometer. The GPS sensor may correspond to a reference frame defined to measure velocity (e.g., speed and direction, which may be used to derive acceleration). The accelerometer measures a magnitude of acceleration in a direction in the reference frame of the mobile device. The mobile device may use the accelerometer measurements to determine that acceleration during a drive is typically within certain thresholds (e.g., averaging over a number of drives) and when mapped to the reference frame of the vehicle, the mobile device may use the accelerometer measurements to determine a direction of the acceleration relative to the vehicle (e.g., forward and backward with respect to the vehicle). The accelerometer may detect a lateral acceleration or an acceleration greater than a threshold value that a total loss module may use to determine an occurrence of a loss event (e.g., a collision, mechanical failure, or the like). The total loss module may use GPS measurements in addition to or in place of the acceleration measurements to provide position information that corresponds to a position of the vehicle. For example, the total loss model may determine that the position information indicates that a change in position of the mobile device (and by extension the vehicle) was unexpected and likely due to a crash event.

As another example, mobile device 104 may detect that a magnitude of accelerometer measurements is larger than a threshold value (e.g., indicating that an outside force is acting on the vehicle). The accelerometer measurements may be analyzed as a function of time to determine a time interval over which the vehicle changed acceleration or velocity. The change in acceleration or velocity may indicate whether changes in accelerometer measurements correspond to speed decreases of the vehicle such as, for example, from a speed above a threshold value (e.g., 20 mph) to a speed that is close or equal to zero. The total loss module may determine that a rapid acceleration (e.g., in a backwards direction indicating a deceleration of the vehicle) along with an extended time interval of a speed at or close to zero is indicative of a crash event.

In some instances, the total loss module may determine that a rapid acceleration corresponds to a loss event that is not a collision. The total loss module may correlate the accelerometer measurements with other sensors of the mobile device to determine a type of loss event. For instance, the total loss module may detect anomalous accelerometer measurements such as measurements that are too large (e.g., larger than a first threshold value) to be associated with a collision. The total loss module may correlate the accelerometer measurements with magnetometer measurements, audio or video captured by the mobile device, or the like to identify a likely cause of the anomalous accelerometer measurements. In a first example, magnetometer measurements that overlap in time with the accelerometer measurements may indicate a transmission problem. In another example, the microphone of the mobile device may capture a sound indicative of a flat or blown tire. By correlating the sensor measurements, the total loss module may identify any type of total loss event include, but not limited to, collisions, mechanical failure, electrical failure, structural failure, or the like.

At block 304, the process 300 continues, identifying a first set of data associated with the crash event (e.g., such as by the total loss module as previously described). For example, the mobile device may continuously collect sensor measurements from the sensors of the mobile device during a driving trip. Upon detection of the crash event, the total loss module may identify a portion of the sensor measurements that are associated with the crash event. In some instances, the first set of data may include the sensor measurements collected over a time interval that includes the crash event. In one example, the first time interval may begin at a first time before the crash event (e.g., such as 10 second, 30 seconds, 5 minutes, etc. before the crash event) and end at a second time after the crash event (e.g., such as 10 second, 30 seconds, 5 minutes, etc. after the crash event). In other examples, the time interval for recording the first set of data may be determined by various thresholds of sensor measurements (e.g., a threshold acceleration, GPS road boundaries or obstacle boundaries, etc.).

In some instances, the total loss module may dynamically control the sensors during the drive based on operating conditions of the vehicle. The total loss module may receive additional data from external sources as part of a determination as to which sensors to activate (e.g., which sensors are to be used to collect sensors measurements) and/or the sampling rates of those sensors. The additional data can include, but is not limited to, current weather, route information, road conditions, traffic, historical collisions along the route, historical collisions or total loss events of the drive, vehicle information (e.g., make, model, year, maintenance records, or the like). For instance, in stop-and-go traffic in bad weather, the total loss module may activate more sensors due the proximity of other vehicles and the likelihood of a collision in bad weather. In another instances, the total loss module may operate fewer sensors (e.g., collect sensor measurements from fewer sensors or collect sensor measurements at a lower sampling rate) when the vehicle is on a highway on a clear day with no traffic.

Upon detecting a crash event (or detecting a high likelihood that crash may occur along the route), the total loss module may dynamically activate inactive sensors (e.g., to begin collecting measurements with sensors that were previously not being used) and/or increase the sampling rate of the active sensors during the crash event (or if the total loss module identifies a high likelihood that crash may occur). The total loss module may specify a first subset of the sensors of the mobile device that are to be used. Upon detection of the crash event, total loss module 201 may specify a second subset of the sensors that includes up to all of the sensors of the mobile device.

At block 306, the process 300 involves generating a first feature vector from the first set of data and the vehicle data (e.g., that includes characteristics of the vehicle). The first set of crash features may be representative of individual measurable characteristics of the crash event (e.g., sensor data) and includes features representative of characteristics of the vehicle. Total loss module 201 may provide the first feature vector to a machine-learning model, such as first machine-learning model 212.

At block 308, the process 300 involves generating a second feature vector using the first set of data, the vehicle data, and an additional data type, such as an airbag activation data type and/or a fluid leakage indicator, as described in connection with additional crash inputs 208. In some instances, the total loss module can generate the second feature vector from the first feature vector by concatenating the one or more additional data types to the first feature vector. The features of the second set of crash features may be representative of individual measurable characteristics of the crash event (e.g., sensor data), features representative of characteristics of the vehicle, and features representative of the one or more additional data types. Examples of the one or more additional data types include, but are not limited to, features that represent measured indications of fluid leakage, airbag deployment, medical condition of the driver, responses to survey questions received from the driver via the user interface, or the like.

At block 310, the process 300 involves predicting a confidence of a total loss event. The TLE prediction model uses a first machine-learning model and a second machine-learning model, such as first machine-learning model 212 or second machine-learning model 214 to compute a confidence that a total loss event has occurred to the vehicle. The confidence may be a probability that that a loss event is a total loss event. The confidence may be represented as a percentage (e.g., of 100), an integer, a grade (e.g., low, medium, high, A-F, or the like) or in any manner capable of identifying a confidence that a loss event is a total loss event.

Examples of the first machine-learning model and the second machine-learning model include, but are not limited to, decision trees, neural networks, Bayesian networks, or the like. In some cases, the first machine-learning model predicts a first confidence using the first feature vector that includes the vehicle data and the first set of data and the second machine-learning model predicts a second confidence using the second feature vector that includes the additional data types, the first set of data recorded, and the vehicle data. In other cases, the first machine-learning model may generate the first confidence (using the first feature vector) and the second confidence (using the second feature vector). In other cases, the second machine-learning model may generate the first confidence and the second confidence.

It should be appreciated that the specific steps illustrated in FIG. 3 provide a particular method of predicting a confidence of a total loss event according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 4:
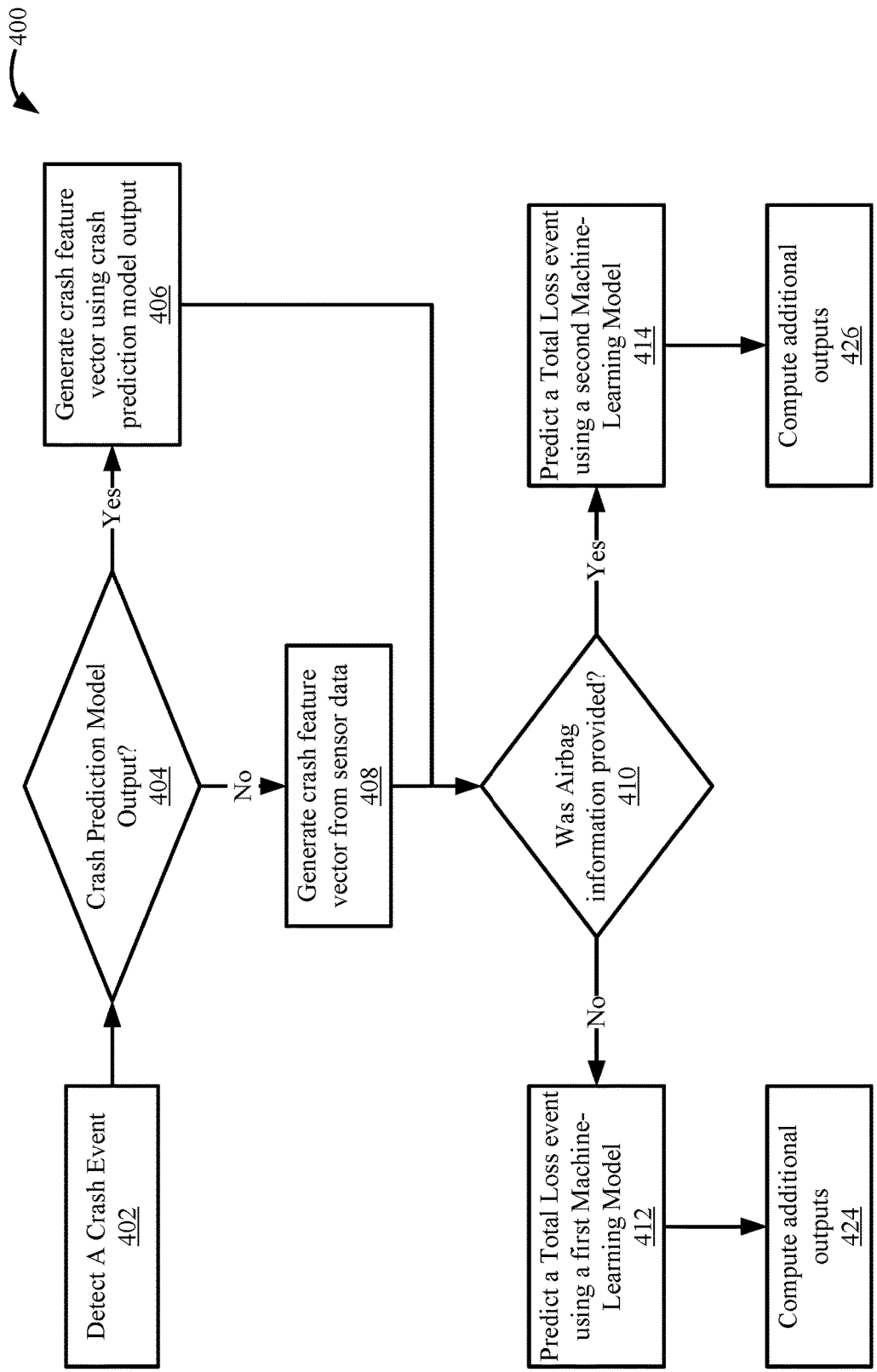
FIG. 4 is a flowchart for predicting of a total loss event using machine-learning models according to some embodiments.

FIG. 4 is a flowchart of a process 400 for predicting a confidence of a total loss event using machine-learning models according to some embodiments.

At block 402, the process 400 involves detecting a crash event. The mobile device, such as mobile device 104 of FIG. 1, may detect a crash event by executing an application that analyzes sensor measurements of the mobile device. In some instances, a crash event may be detected using one or more sensors of the mobile device. The mobile device may use the one or more sensors to identify other attributes associated with the crash event such as, but not limited a location, timestamp, current traffic, current weather, historical collisions at the location, or the like. The operations of block 402 may be executed as described with regard to block 302 of FIG. 3.

At block 404, the process 400 involves generating a crash prediction using a crash prediction model. For example, the crash prediction may be generated based on a sensor of the mobile device determining a measurement of the accelerometer that is above a threshold value, a variation in lateral vehicle position (e.g., indicating the vehicle is going off of the road), rumble strip detection (e.g., to determine if a vehicle is going off of the road), frequent and/or hard braking (e.g., indicative of heavy congestion and/or not keeping the proper distance from vehicles in front of the driver), distracted driving (e.g., sensed driver interaction with the mobile device while the vehicle is in motion), and the like. The crash prediction model may be a trained model to output a likelihood that a vehicle crash has occurred based on the sensor data and contextual information such as the factors listed above.

For some embodiments, when the crash prediction model generates an output, the process 400 proceeds to block 406. In other embodiments, when the crash prediction model generates an output that is below a threshold value, the process 400 proceeds to block 408. For instance, the crash prediction model may generate an output only when the likelihood of the crash event is greater than a threshold crash likelihood. In some cases, the crash prediction model may generate a null output when the likelihood of the crash event is less than a threshold crash likelihood. In other cases, the crash prediction model may generate an output that is a binary value for all examples of the crash prediction model. In these cases, the process 400 may proceed to block 408 when the binary output indicates that crash event has occurred, while proceeding to block 406 when the binary output indicates that crash event has not occurred.

At block 406, the process 400 involves generating a crash feature vector using an output of the crash prediction model. The crash feature vector, for example, may include crash features extracted from some or all of the data received from driving sensors and include a crash prediction (e.g., a statistical likelihood that a crash event occurred). The crash feature vector may be output by the crash prediction model and can include summary statistics (e.g., median, variance, and maximum) over the various signals collected from the sensors of the mobile device that correspond to different aspects of the crash event. The crash features may be extracted using time windows of different lengths before, during, or after the crash event. Each window may be centered at the time point of the crash event and extend to a time prior to the crash event and to a time after the crash event. The generation of the crash feature vector produces a set of values for crash event.

At block 408, the process 400 involves generating a crash feature vector from sensor data of mobile device 104. For instance, since the crash prediction model predicted that a crash did not occur or generated a low accuracy output, the total loss module may generate the crash feature vector directly from the sensor data collected from the sensors of the mobile device. Total loss module may set a null value (or a binary value) for the value of the crash prediction model when the crash prediction model output is low accuracy or predicted that a crash did not occur.

At block 410, the process 400 involves determining whether airbag information is provided. Total loss module can determine, using the crash feature vector, whether an airbag activation data type is provided. For a first example, the crash feature vector may include an airbag status value. Total loss module may receive airbag status from driving sensors or from additional crash inputs 208. For some cases, driving sensors may detect an airbag status during a time window associated with the crash event. Mobile device 104 may also employ other sensors (e.g., communicatively coupling to an airbag system indicator of the vehicle) to determine if an airbag activation data type is provided. For example, the airbag activation data type may be received from user input via a user interface. For an example of process 400 in which an airbag activation data type is provided, the process 400 proceeds to block 414. Otherwise, during a process 400 in which an airbag activation data type is not provided or otherwise unknown, the process 400 proceeds to block 412.

At block 412, the TLE prediction model uses a first machine-learning model to predict a first confidence using the first feature vector. The first machine-learning model may be trained using training data representative of the sensor data and the vehicle data (make, model, year, vehicle identification number (VIN) of the vehicle, or the like). The first machine-learning model may generate a confidence that corresponds to sensor measurements associated with the crash event and the vehicle data. The first machine-learning model may be a decision tree that outputs a confidence that the vehicle has been involved in a total loss event. The first machine-learning model may use some or all of the data values of the crash feature vector to predict a confidence of a total loss event. The process 400 proceeds from block 412 to block 424.

At block 424, the TLE prediction model computes additional outputs related to the total loss event. TLE prediction model can output additional confidences to the user of the mobile device 104. In a first example, the TLE prediction model can output a mileage estimation by using the sensor data to compute distance traveled over a period of time and the vehicle age (e.g., computed from model year). TLE prediction model can additionally output estimated value of the vehicle at the time of the crash event using the mileage estimation and the vehicle age.

Returning to block 410, during an example of process 400 in which an airbag activation data type is provided, the process 400 proceeds to block 414. At block 414, the TLE prediction model uses a second machine-learning model, such as second machine-learning model 214 of FIG. 2, to predict a confidence using the crash feature vector. The second machine-learning model may be trained using training data representative of the sensor data, vehicle data, and the additional data types. In some cases, the TLE prediction model may use second machine-learning model in multiple examples with different values of the additional data types.

For example, second machine-learning model may generate a confidence when an airbag activation data type is provided. In this example, second machine-learning model can generate a confidence that the crash event is a total loss based on a value indicating whether the airbag deployed during the crash event (e.g., either deployed or not deployed) based on the airbag information provided by the total loss module. The second machine-learning model may be trained using training data representative of the sensor data and airbag information (e.g., deployed, non-deployed). The second machine-learning model may generate a confidence that corresponds to sensor measurements associated with the crash event and the airbag information. The second machine-learning model may be a decision tree that outputs a confidence that the vehicle has been involved in a total loss event. The second machine-learning model may use some or all of the data values of the second feature vector to predict a confidence of a total loss event.

At block 426, the TLE prediction model computes additional outputs related to the total loss event that include the outputs from block 414 as well as the additional outputs described in connection with block 424. Thus, the TLE prediction model can output a mileage estimation by using the sensor data to compute distance traveled over a period of time and the vehicle age (e.g., computed from model year) as well as estimated value of the vehicle at the time of the crash event using the mileage estimation and the vehicle age.

It should be appreciated that the specific steps illustrated in FIG. 4 provide a particular method of predicting a confidence of a total loss event using machine-learning models according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
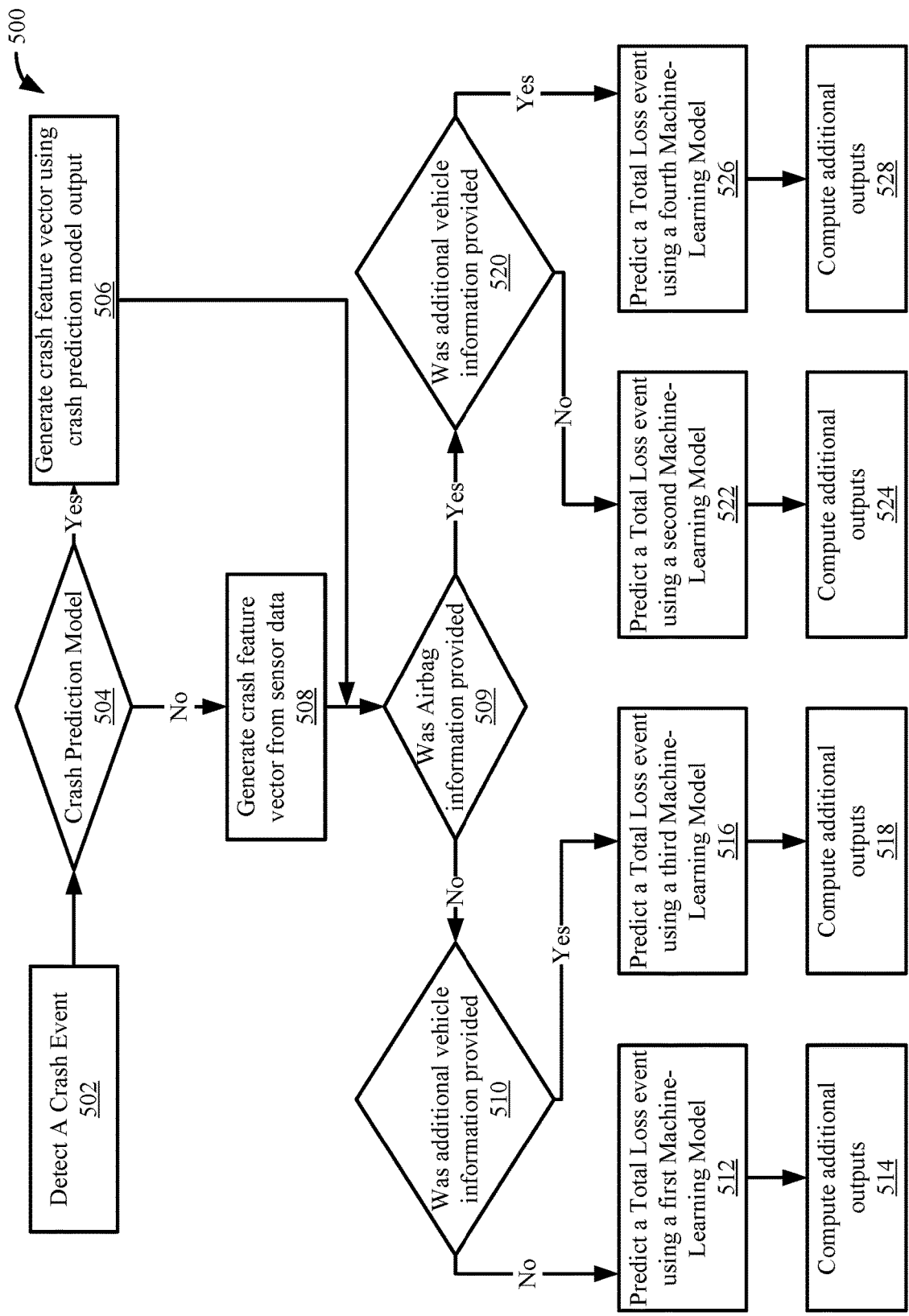
FIG. 5 is a flowchart for predicting a confidence of a total loss event using additional machine-learning models with additional input data types according to some embodiments.

FIG. 5 is a flowchart for predicting a confidence of a total loss event using additional machine-learning models with additional input data types according to some embodiments. At block 502, a crash event associated with an application (e.g., such as a total loss module as previously described) of a mobile device is detected. The crash event, such as crash event 204, may be detected using one or more sensors of the mobile device (e.g., such as sensors of sensor data block 108 of mobile device 104). As a first example, the mobile device can detect a crash event by detecting changes in vehicle movement by, for example, using a GPS sensor or an accelerometer. The GPS sensor may correspond to a reference frame defined to measure velocity (e.g., speed and direction, which may be used to derive acceleration). The accelerometer measures a magnitude of acceleration in a direction in the reference frame of the mobile device. The mobile device may use the accelerometer measurements to determine that acceleration during a drive is typically within certain thresholds (e.g., averaging over a number of drives) and when mapped to the reference frame of the vehicle, the mobile device may use the accelerometer measurements to determine a direction of the acceleration relative to the vehicle (e.g., forward and backward with respect to the vehicle). The accelerometer may detect a lateral acceleration or an acceleration greater than a threshold that a total loss module may use to determine an occurrence of a loss event (e.g., a collision, mechanical failure, or the like). The total loss module may use GPS measurements in addition to or in place of the acceleration measurements to provide position information that corresponds to a position of the vehicle. For example, the total loss module may determine that the position information indicates that a change in position of the mobile device (and by extension the vehicle) was unexpected and likely due to a crash event.

As another example, mobile device 104 may detect that a magnitude of accelerometer measurements is larger than a threshold value (e.g., indicating that an outside force is acting on the vehicle). The accelerometer measurements may be analyzed as a function of time to determine a time interval over which the vehicle changed acceleration or velocity. The change in acceleration or velocity may indicate whether changes in accelerometer measurements correspond to speed decreases of the vehicle such as, for example, from a speed above a threshold value (e.g., 20 mph) to a speed that is close or equal to zero. The total loss module may determine that a rapid acceleration (e.g., in a backwards direction indicating a deceleration of the vehicle) along with an extended time interval of a speed at or close to zero is indicative of a crash event.

In some instances, the total loss module may determine that a rapid acceleration corresponds to a loss event that is not a collision. The total loss module may correlate the accelerometer measurements with other sensors of the mobile device to determine a type of loss event. For instance, the total loss module may detect anomalous accelerometer measurements such as measurements that are too large (e.g., larger than a first threshold value) to be associated with a collision. The total loss module may correlate the accelerometer measurements with magnetometer measurements, audio or video captured by the mobile device, or the like to identify a likely cause of the anomalous accelerometer measurements. In a first example, magnetometer measurements that overlap in time with the accelerometer measurements may indicate a transmission problem. In another example, the microphone of the mobile device may capture a sound indicative of a flat or blown tire. By correlating the sensor measurements, the total loss module may identify any type of total loss event include, but not limited to, collisions, mechanical failure, electrical failure, structural failure, or the like.

At block 504, the process 500 involves generating a crash prediction model. For example, the crash prediction may be generated based on a sensor of the mobile device determining a measurement of the accelerometer that is above a threshold value, a variation in lateral vehicle position (e.g., indicating the vehicle is going off of the road), rumble strip detection (e.g., to determine if a vehicle is going off of the road), frequent and/or hard braking (e.g., indicative of heavy congestion and/or not keeping the proper distance from vehicles in front of the driver), distracted driving (e.g., sensed driver interaction with the mobile device while the vehicle is in motion), and the like. The crash prediction model may be a trained model to output a likelihood that a vehicle crash has occurred based on the sensor data and contextual information such as the factors listed above.

For some embodiments, when the crash prediction model generates an output, the process 500 proceeds to block 506. In other embodiments, when the crash prediction model generates an output that is below a threshold value, the process 500 proceeds to block 508. For instance, the crash prediction model may generate an output only when the likelihood of the crash event is greater than a threshold crash likelihood. In some cases, the crash prediction model may generate a null output when the likelihood of the crash event is less than a threshold crash likelihood. In other cases, the crash prediction model may generate an output that is a binary value for all examples of the crash prediction model. In these cases, the process 500 may proceed to block 508 when the binary output indicates that crash event has occurred, while proceeding to block 506 when the binary output indicates that crash event has not occurred.

At block 506, the process 500 involves generating a crash feature vector using an output of the crash prediction model. The crash feature vector, for example, may include features extracted from some or all of the data received from driving sensors and include a crash prediction (e.g., a statistical likelihood that a crash event occurred). The crash feature vector may be output by the crash prediction model and can include summary statistics (e.g., median, variance, and maximum) over the various signals collected from the sensors of the mobile device that correspond to different aspects of the crash event. The features may be extracted using time windows of different lengths before, during, or after the crash event. Each window may be centered at the time point of the crash event and extend to a time prior to the crash event and to a time after the crash event. The generation of the crash feature vector produces a set of values for crash event.

At block 508, the process 500 involves generating a crash feature vector from sensor data. The sensor data may be from a mobile device, such as mobile device 104. For instance, since the crash prediction model predicted that a crash did not occur or generated a low accuracy output, the total loss module may generate the crash feature vector directly from the sensor data collected from the sensors of the mobile device. Total loss module may set a null value (or a binary value) for the value of the crash prediction model when the crash prediction model output is low accuracy or predicted that a crash did not occur.

At block 509, the process 500 involves determining whether airbag information is provided. Total loss module can determine, using the crash feature vector, whether an airbag activation data type is provided. For a first example, the crash feature vector may include an airbag status value. Total loss module may receive airbag status from driving sensors or from additional crash inputs 208. For some cases, driving sensors may detect an airbag status during a time window associated with the crash event. Mobile device 104 may also employ other sensors (e.g., communicatively coupling to an airbag system indicator of the vehicle) to determine if an airbag activation data type is provided. For example, the airbag activation data type may be received from user input via a user interface. In an example in which an airbag activation data type is not available, the process 500 proceeds to block 510. In another example in which an airbag activation data type is available, the process 500 proceeds to block 520.

At block 510, the process 500 involves determining whether additional vehicle information is provided. For example, the TLE prediction model can determine whether additional information is available (e.g., additional values included in the feature vector). Examples of additional vehicle information include information representing a fluid leakage, structural integrity, route information, traffic, maintenance history, recalls, etc. In an example in which additional vehicle information is not available, the process 500 proceeds to block 512. In another example in which additional vehicle information is available, the process 500 proceeds to block 516.

At block 512, the process 500 involves predicting a total loss event using a first machine-learning model. The first machine-learning model may be trained using the sensor data (e.g., from sensors of the mobile device or an output from a crash prediction model) without using the airbag activation data type or the additional vehicle data. The first machine-learning model may be a decision tree that outputs a confidence that the vehicle has been involved in a total loss event. The first machine-learning model may use some or all of the data values of the crash feature vector to predict a confidence of a total loss event. The process 500 proceeds from block 512 to block 514.

At block 514, the process 500 involves computing additional outputs as described in connection with block 424 of FIG. 4. For instance, the TLE prediction model can output additional confidences to the user of the mobile device 104. In a first example, the TLE prediction model can output a mileage estimation by using the sensor data to compute distance traveled over a period of time and the vehicle age (e.g., computed from model year). TLE prediction model can additionally output estimated value of the vehicle at the time of the crash event using the mileage estimation and the vehicle age.

Returning to block 510, during an example of process 500 in which additional vehicle information is provided, the process 500 proceeds to block 516. At block 516, the process 500 involves predicting a total loss event using a third machine-learning model. The third machine-learning model may be trained using the sensor data (e.g., from driving sensors 202 or crash prediction model output) without using the airbag activation data type, but including at least one data type of additional vehicle information. In some cases, the TLE prediction model may use the third machine-learning model in multiple examples with different values of the additional data types.

For example, the third machine-learning model may generate a confidence when a fluid leakage indicator is provided. In this example, the third machine-learning model can generate a confidence that the crash event is a total loss based on a value indicating whether there was fluid leakage after the crash event (e.g., either leak detected or no leak detected) based on the fluid leakage information provided by the total loss module. The third machine-learning model may be trained using training data representative of the first set of data and fluid leakage information (e.g., leak detected, no leak detected). The third machine-learning model may generate a confidence that corresponds to sensor measurements associated with the crash event and the fluid leakage information. The third machine-learning model may be a decision tree that outputs a confidence that the vehicle has been involved in a total loss event. The third machine-learning model may use some or all of the data values of the crash feature vector to predict a confidence of a total loss event. The process 500 proceeds from block 516 to block 518.

At block 518, the process 500 involves computing additional outputs. The TLE prediction model may compute additional outputs relating to the total loss event that include the outputs from block 512 as well as the additional outputs described in connection with block 424 as described in connection with FIG. 4. For instance, the TLE prediction model can output additional confidences to the user of the mobile device 104. In a first example, the TLE prediction model can output a mileage estimation by using the sensor data to compute distance traveled over a period of time and the vehicle age (e.g., computed from model year). TLE prediction model can additionally output estimated value of the vehicle at the time of the crash event using the mileage estimation and the vehicle age.

Returning to block 509, during an example of process 500 in which the airbag activation data type is available, the process 500 proceeds to block 520. At block 520, the process 500 involves determining whether additional vehicle information is provided. For example, the TLE prediction model can determine whether additional information is available (e.g., additional values included in the feature vector). Examples of additional vehicle information include information representing a fluid leakage, structural integrity, route information, traffic, maintenance history, recalls, etc. In an example in which additional vehicle information is not available, the process 500 proceeds to block 522. In another example in which additional vehicle information is available, the process 500 proceeds to block 526.

At block 522, the process 500 involves predicting a total loss event using a second machine-learning model. The second machine-learning model may be trained using the sensor data (e.g., from driving sensors 202 or crash prediction model output) and airbag activation data. The second machine-learning model may be a decision tree that outputs a confidence that the vehicle has been involved in a total loss event. The second machine-learning model may use some or all of the data values of the crash feature vector to predict a confidence of a total loss event. The process 500 proceeds from block 522 to block 524.

At block 524, the process 500 involves computing additional outputs. For instance, the TLE prediction model can output a mileage estimation by using the sensor data to compute distance traveled over a period of time and the vehicle age (e.g., computed from model year) as well as estimated value of the vehicle at the time of the crash event using the mileage estimation and the vehicle age.

Returning briefly to block 520, during an example of process 500 in which additional vehicle information is provided, the process 500 proceeds to block 526. At block 526, the process 500 involves predicting a total loss event using a fourth machine-learning model. The fourth machine-learning model may be trained using the sensor data (e.g., from driving sensors 202 or crash prediction model output) and airbag activation data and at least one data type of additional vehicle information. In some cases, the TLE prediction model may use the fourth machine-learning model in multiple examples with different values of the additional data types.

For example, the fourth machine-learning model may generate a confidence when the airbag activation data is provided. In this example, the fourth machine-learning model can generate a confidence that the crash event is a total loss based on a value indicating whether the airbag deployed during the crash event (e.g., either deployed or not deployed) based on the airbag information provided by the total loss module. The fourth machine-learning model may be trained using training data representative of the sensor data and airbag information (e.g., deployed, non-deployed). The fourth machine-learning model may generate a confidence that corresponds to sensor measurements associated with the crash event and the airbag information. The fourth machine-learning model may be a decision tree that outputs a confidence that the vehicle has been involved in a total loss event. The fourth machine-learning model may use some or all of the data values of the crash feature vector to predict a confidence of a total loss event. The process 500 proceeds from block 526 to block 528.

At block 528, the process 500 involves computing additional outputs. For instance, the TLE prediction model computes additional outputs relating to the total loss event. In some examples, TLE prediction model may include additional models that are trained for other various types of data. TLE prediction model may use any number of models to accommodate different data types and provide a prediction tailored to the data types available for each crash event.

It should be appreciated that the specific steps illustrated in FIG. 5 provide a particular method of predicting a confidence of a total loss event using additional machine-learning models with additional input data types according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
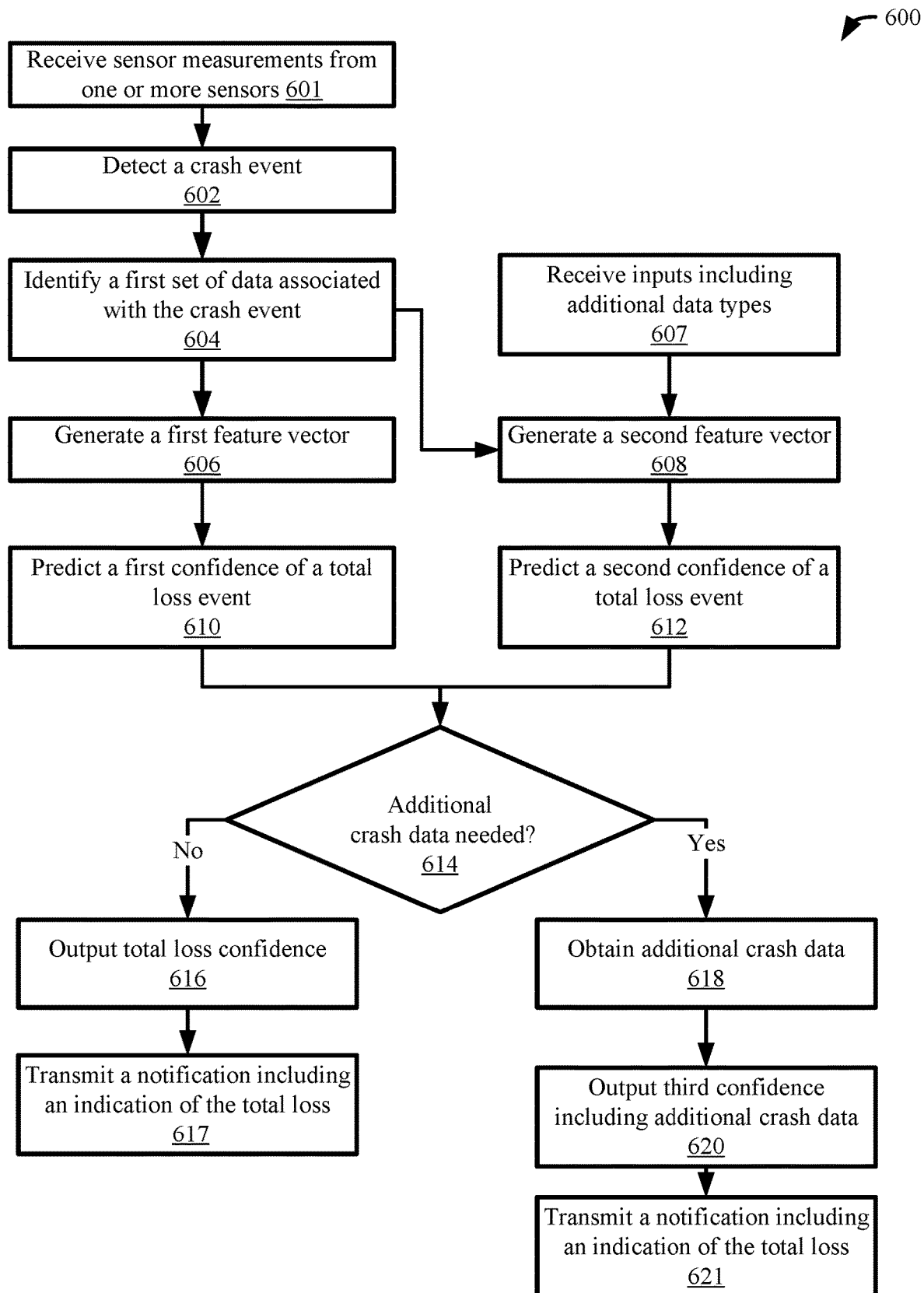
FIG. 6 is another exemplary process for predicting a confidence of a total loss event confidence according to some embodiments.

FIG. 6 is an exemplary process 600 for predicting a confidence of a total loss event using additional feature vectors to generate additional confidence values according to some embodiments. At block 601, the process 600 involves receiving sensor measurements from one or more sensors of the mobile device (e.g., such as sensors of sensor data block 108 of mobile device 104). For instance, a total loss module, such as total loss module 201 illustrated in FIG. 2, may receive inputs from driving sensors that detect movement of the mobile device or contextual information about the external environment.

At block 602, the process 600 involves detecting, using sensor measurements from driving sensors of the mobile device, a crash event indicating an occurrence of a a crash event. The operations performed at block 602 are substantially similar to the operations described in connection with blocks 302, 402, and 502. For example, a crash event may be detected from changes in vehicle movement by, for example, using sensor measurements from a GPS sensor or an accelerometer. The GPS sensor may correspond to a reference frame defined to measure velocity (e.g., speed and direction, which may be used to derive acceleration). The accelerometer measures a magnitude of acceleration in a direction in the reference frame of the mobile device. The accelerometer measurements may be used to determine that acceleration during a drive is typically within certain thresholds (e.g., averaging over a number of drives) and when mapped to the reference frame of the vehicle, the accelerometer measurements may be used to determine a direction of the acceleration relative to the vehicle (e.g., forward and backward with respect to the vehicle). The accelerometer may detect a lateral acceleration or an acceleration greater than a threshold that a total loss module may use to determine an occurrence of a loss event (e.g., a collision, mechanical failure, or the like). The total loss module may use GPS measurements in addition to or in place of the acceleration measurements to provide position information that corresponds to a position of the vehicle. For example, the total loss module may determine that the position information indicates that a change in position of the vehicle was unexpected and likely due to a crash event.

As another example, mobile device 104 may detect that a magnitude of accelerometer measurements is larger than a threshold value (e.g., indicating that an outside force is acting on the vehicle). The accelerometer measurements may be analyzed as a function of time to determine a time interval over which the vehicle changed acceleration or velocity. The change in acceleration or velocity may indicate whether changes in accelerometer measurements correspond to speed decreases of the vehicle such as, for example, from a speed above a threshold value (e.g., 20 mph) to a speed that is close or equal to zero. The total loss module may determine that a rapid acceleration (e.g., in a backwards direction indicating a deceleration of the vehicle) along with an extended time interval of a speed at or close to zero is indicative of a crash event.

In some instances, the total loss module may determine that a rapid acceleration corresponds to a loss event that is not a collision. The total loss module may correlate the accelerometer measurements with other sensors of the mobile device to determine a type of loss event. For instance, the total loss module may detect anomalous accelerometer measurements such as measurements that are too large (e.g., larger than a first threshold value) to be associated with a collision. The total loss module may correlate the accelerometer measurements with magnetometer measurements, audio or video captured by the mobile device, or the like to identify a likely cause of the anomalous accelerometer measurements. In a first example, magnetometer measurements that overlap in time with the accelerometer measurements may indicate a transmission problem. In another example, the microphone of the mobile device may capture a sound indicative of a flat or blown tire. By correlating the sensor measurements, the total loss module may identify any type of total loss event include, but not limited to, collisions, mechanical failure, electrical failure, structural failure, or the like.

At block 604, the process 600 involves identifying a first set of data from the sensor measurements, wherein the first set of data is associated with the crash event. The operations performed at block 604 are substantially similar to the operations described in connection with block 304. For example, the mobile device may continuously collect sensor measurements from the sensors of the mobile device during a driving trip. Upon detection of the crash event, the total loss module may identify a portion of the sensor measurements that are associated with the crash event. In some instances, the first set of data may include the sensor measurements collected over a time interval that includes the crash event. In one example, the first time interval may begin at a first time before the crash event (e.g., such as 10 second, 30 seconds, 5 minutes, etc. before the crash event) and end at a second time after the crash event (e.g., such as 10 second, 30 seconds, 5 minutes, etc. after the crash event). In other examples, the time interval for recording the first set of data may be determined by various thresholds of sensor measurements (e.g., a threshold acceleration, GPS road boundaries or obstacle boundaries, etc.).

In some instances, the total loss module may dynamically control the sensors during the drive based on operating conditions of the vehicle. The total loss module may receive additional data from external sources as part of a determination as to which sensors to activate (e.g., which sensors are to be used to collect sensors measurements) and/or the sampling rates of those sensors. The additional data can include, but is not limited to, current weather, route information, road conditions, traffic, historical collisions along the route, historical collisions or total loss events of the drive, vehicle information (e.g., make, model, year, maintenance records, or the like). For instance, in stop-and-go traffic in bad weather, the total loss module may activate more sensors due the proximity of other vehicles and the likelihood of a collision in bad weather. In another instances, the total loss module may operate fewer sensors (e.g., collect sensor measurements from fewer sensors or collect sensor measurements at a lower sampling rate) when the vehicle is on a highway on a clear day with no traffic.

Upon detecting a crash event (or detecting a high likelihood that crash may occur along the route), the total loss module may dynamically activate inactive sensors (e.g., to begin collecting measurements with sensors that were previously not being used) and/or increase the sampling rate of the active sensors during the crash event (or if the total loss module identifies a high likelihood that crash may occur). The total loss module may specify a first subset of the sensors of the mobile device that are to be used. Upon detection of the crash event, total loss module 201 may specify a second subset of the sensors that includes up to all of the sensors of the mobile device. The process 600 may proceed in parallel to block 606 and block 608.

At block 606, the process 600 involves generating a first feature vector using the first set of data and vehicle data, wherein the vehicle data includes an identifier of the vehicle. The operations performed at block 606 are substantially similar to the operations described in connection with blocks 306. For example, the first feature vector may be representative of individual measurable characteristics of the crash event (e.g., sensor data) and includes features representative of characteristics of the vehicle. Total loss module 201 may provide the first feature vector to a machine-learning model, such as first machine-learning model 212.

At block 607, the process 600 involves receiving inputs including additional data types. TLE prediction model 210 may receive additional data types, such as additional crash inputs 208. TLE prediction model 210 may receive additional data types such as vehicle information (e.g., a fluid leakage indicator, a structural fracture indicator, etc.).

At block 608, the process 600 involves generating a second feature vector using the first set of data associated with the crash event, vehicle data, and the additional data types. The operations performed at block 608 are substantially similar to the operations described in connection with blocks 308. For example, the total loss module can generate the second feature vector from the first feature vector by concatenating the one or more additional data types to the first feature vector. The features of the second feature vector may be representative of individual measurable characteristics of the crash event (e.g., sensor data), features representative of characteristics of the vehicle, and features representative of the one or more additional data types. Examples of the one or more additional data types include, but are not limited to, features that represent measured indications of fluid leakage, airbag deployment, medical condition of the driver, responses to survey questions received from the driver via the user interface, or the like.

At block 610, the process 600 involves predicting a first confidence of a total loss event by generating a first confidence value using a first machine-learning model and the first feature vector. The operations at block 610 are substantially similar to the operations in connection with block 412. For example, the first machine-learning model may be trained using training data representative of the sensor data and the vehicle data (make, model, year, VIN of the vehicle, or the like). The first machine-learning model may generate a confidence that corresponds to sensor measurements associated with the crash event and the vehicle data. The first machine-learning model may be a decision tree that outputs a confidence that the vehicle has been involved in a total loss event. The first machine-learning model may use some or all of the data values of the crash feature vector to predict a confidence of a total loss event.

At block 612, the process 600 involves predicting a second confidence of a total loss event by generating a second confidence value using a second machine-learning model and the second feature vector. For example, the second machine-learning model can generate a confidence for a crash event with an airbag deployment data type (e.g., a value indicating that the airbag did or did not deploy during the crash event) using the second feature vector. The value of the airbag deployment data type may be derived from the sensor data, from a prediction by a machine-learning model, or from user input. In some instances, the second machine-learning model may generate a second confidence for the same crash event using different values where the airbag information is not provided. In those instances, the second machine-learning model may generate a second confidence with the airbag deployment data type set to non-deployment (during the crash event) and another second confidence with the airbag deployment data set to deployed (during the crash event).

In a first example, such as described with regard to FIG. 4, the total loss module may provide airbag information as an input to the second machine-learning model which can compute the second confidence using the airbag information provided. In another example, airbag information is not provided to the second machine-learning model. In this example, the second machine-learning model can generate the second confidence using different values, first with the airbag activation data set initially to indicate a non-deployment of the airbag. Additionally, the second machine-learning model can generate an additional confidence value with the airbag activation value set to indicate airbag deployment. Since the second machine-learning model may be trained to use airbag activation data, the multiple outputs can determine whether airbag activation data of the crash event affects the confidence that a total loss event occurred.

For example, for a particular crash event, the second machine-learning model may generate a second confidence in which the value of the airbag deployment data type is set to non-deployment (e.g., airbag did not deploy). It may be determined that the second confidence is less than a threshold value confidence. The second machine-learning model may generate an additional second confidence in which the value of the airbag deployment data type indicates deployed. It may be determined that the additional second confidence is greater than the threshold value confidence. Since there is a conflict (e.g., a difference) between the second confidence and the additional second confidence that would change the output (e.g., whether a total loss is identified), the total loss module determines that the airbag deployment information may be necessary to determine if the crash event is a total loss event. In those instances, a request for additional information via a user input may be requested to obtain the airbag information. In some cases, the second machine-learning model may compute a threshold difference between the second confidence and the additional second confidence to determine that a conflict is present (e.g., a 20% difference).

At block 614, the process 600 involves determining whether additional crash data is to be used to predict the total loss event. For example, the TLE prediction model 210 can identify a conflict in the first confidence, the second confidence, or the additional second confidence. TLE prediction model 210 can determine that additional crash data, such as airbag activation data, can provide a prediction that resolves the conflict between the first confidence, the second confidence, or the additional second confidence. TLE prediction model 210 can determine, based on the conflict that additional crash data (e.g., airbag activation data) is needed. TLE prediction model 210 can request airbag activation data from a user input via a user interface of mobile device 104, such as with a survey question. Additionally or alternatively, the TLE prediction model 210 can derive the additional crash data such as airbag activation data, from additional data from sensors of the mobile device or from external sources (e.g., one or more external sensors or devices) and process the additional data using a machine-learning model trained to process the data types included in the additional data. For an example of process 600 in which additional crash data is not needed, the process 600 proceeds to block 616. Otherwise, during a process 600 in which additional crash data is needed, the process 600 proceeds to block 618.

At block 616, the process 600 involves outputting the total loss confidence. For example, the TLE prediction model 210 can determine that the first confidence or the second confidence is a conclusive prediction of the total loss event. For instance, the total loss confidence can be the first confidence of the first machine-learning model when the airbag information is not available and there is no conflict with the second confidence or the additional second confidence. The total loss confidence can be the second confidence when the airbag information is available and is used to generate the second confidence. The TLE prediction model 210 can output the total loss confidence to a user of the mobile device. Alternatively or additionally, TLE prediction model 210 can transmit the total loss confidence to another computing system. For example, at block 617, the process 600 involves transmitting a notification including an indication of the total loss. Transmitting the indication of the total loss may include using the data transmission block 164 For example, transmitting the total loss may include using one or more of the wireless transceiver 168, cellular transceiver 172, or direct transmission 176 to transmit the indication of the total loss.

Returning to block 614, during an example of process 600 in which additional crash data is needed, the process 600 proceeds to block 618. At block 618, the process 600 involves obtaining additional crash data. TLE prediction model 210 may receive additional crash data such as airbag activation data. In some examples, the additional crash data can also include medical status of a driver or passengers in the vehicle, contextual data about the environment of the crash (e.g., weather, road condition, etc.).

At block 620, the process 600 involves outputting a third confidence including the additional crash data. For example, the TLE prediction model 210 can generate a third confidence that includes the second feature vector and the additional crash data (e.g., crash data different from sensor measurements of the first feature vector). TLE prediction model 210 can generate the third confidence using one or more aspects of the additional crash data. The total loss confidence may be the third confidence when the additional information is available and is used to generate the third confidence. The TLE prediction model 210 can output the total loss confidence to a user of the mobile device. Alternatively or additionally, TLE prediction model 210 can transmit the total loss confidence to another computing system. For example, at block 621, the process 600 involves transmitting a notification including an indication of the total loss. Transmitting the indication of the total loss may include using the data transmission block 164 For example, transmitting the total loss may include using one or more of the wireless transceiver 168, cellular transceiver 172, or direct transmission 176 to transmit the indication of the total loss.

It should be appreciated that the specific steps illustrated in FIG. 6 provide a particular method of predicting a confidence of a total loss event using additional feature vectors to generate additional confidence values according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
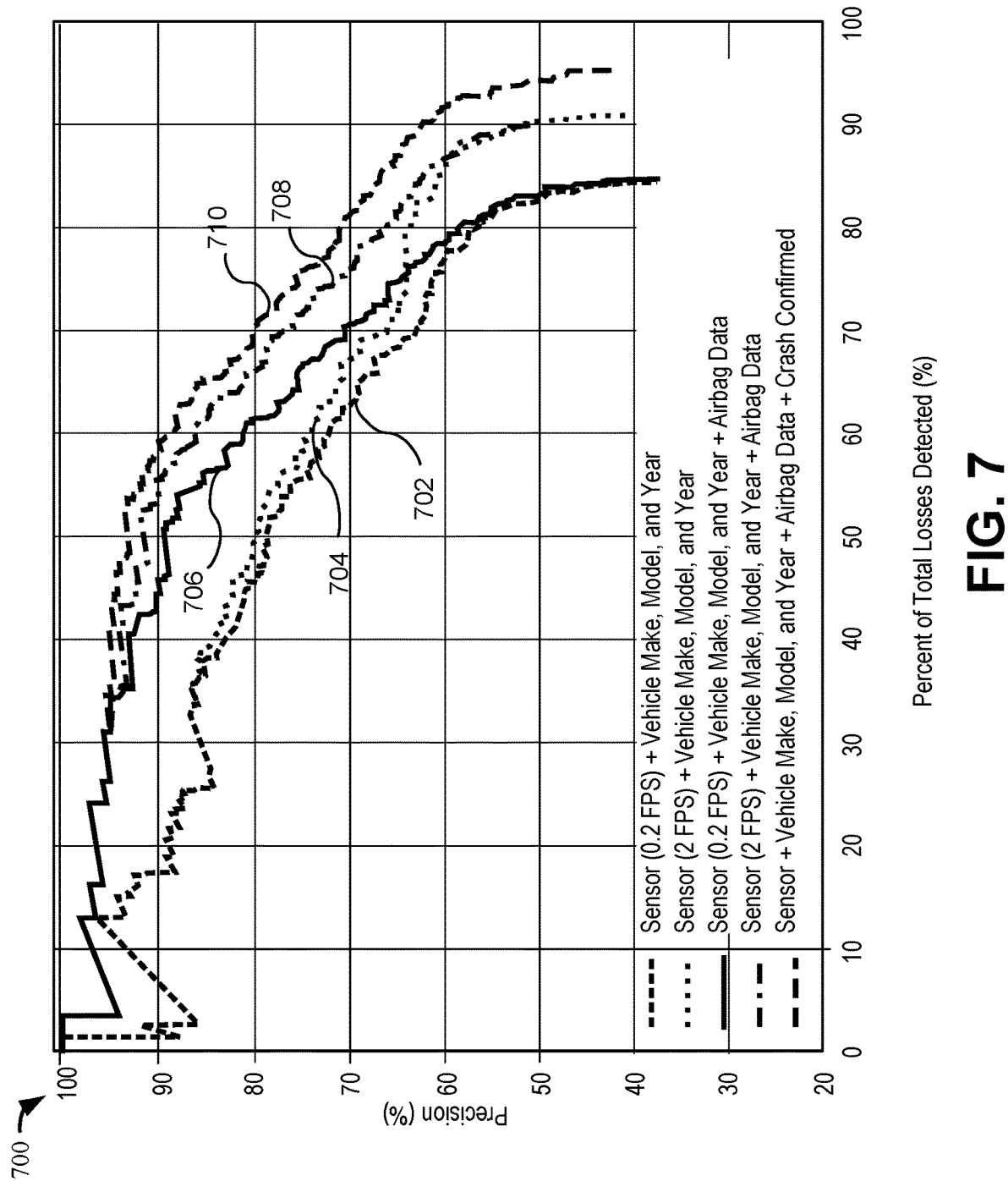
FIG. 7 is an example of a graph of results for predicting total loss events on detected crashes according to some embodiments.

FIG. 7 is an example of a graph 700 of results for predicting total loss events on detected crashes according to some embodiments. As illustrated in FIG. 7, graph 700 depicts plots of precision versus percentage of total loss predictions for a set of detected crashes. The ordinate of graph 700 represents the precision of the total loss predictions. As used herein, "precision" is a fraction of relevant instances (e.g., a vehicle crash) among the retrieved instances (e.g., true positives). The abscissa of graph 700 represents the recall. As used herein, "recall" is a fraction of the total amount of relevant instances that were actually retrieved (e.g., a measure of completeness). The TLE prediction model can use various combinations of input data as described above. For example, the input data may include sensor data, vehicle data, airbag activation data, and crash confirmation data, as described further herein.

In graph 700 illustrated in FIG. 7, precision varies based on the data inputs available to, and used by, the TLE prediction model. For example, curve 702, which is represented by a short dashed line, illustrates the precision of total loss predictions generated using the TLE prediction model given inputs to the TLE prediction model of outputs from driving sensors, the vehicle make, model and year. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The sensor data for curve 702, was collected at 0.2 frames per second over 12,000 miles. Predictions may be based on sensor data collected at higher or lower frame rates than 0.2 frames per second. Predictions may also be based on sensor data collected over fewer or more miles than 12,000 miles. As shown in FIG. 7, curve 702 illustrates that using the outputs from driving sensors and the vehicle make, model and year, the TLE model is able to achieve, at 50% recall, a precision of 78-80%.

As another example, curve 704, which is represented by a dotted line, illustrates the precision of total loss predictions generated using the TLE prediction model given inputs to the TLE prediction model of outputs from driving sensors and the vehicle make, model and year. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The sensor data for curve 704, was collected at 2 frames per second over 12,000 miles. Predictions may be based on sensor data collected at higher or lower frame rates than 2 frames per second. Predictions may also be based on sensor data collected over fewer or more miles than 12,000 miles. As shown in FIG. 7, increasing the frame rate provides an increase in precision from approximately 40% recall through 90% recall, as demonstrated by the higher precision at those recall values for curve 704 compared to curve 702.

In addition to data used by TLE model used to produce curve 702 and curve 704, curve 706, which is represented by a solid line, supplements the sensor data and the vehicle make, model, and year, with airbag detection data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The sensor data for curve 706, was collected at 0.2 frames per second over 12,000 miles. Predictions may be based on sensor data collected at higher or lower frame rates than 0.2 frames per second. Predictions may also be based on sensor data collected over fewer or more miles than 12,000 miles. The airbag activation data may be received from user input via a user interface. Alternatively, or in addition, the airbag activation data may be received from one or more external sensors, such as a vehicle sensor. As shown in FIG. 7, providing airbag activation data to the TLE prediction model in addition to sensor data and vehicle data provides an increase in precision from approximately 0% recall through 75% recall, as demonstrated by the higher precision at those recall values for curve 706 compared to curve 702 and curve 704.

In another example, curve 708, which is represented by a dash-dotted line, illustrates the precision of total loss predictions generated using the TLE prediction model given inputs to the TLE prediction model of outputs from driving sensors, the vehicle make, model and year, and airbag activation data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The sensor data for curve 708, was collected at 2 frames per second over 12,000 miles. Predictions may be based on sensor data collected at higher or lower frame rates than 2 frames per second. Predictions may also be based on sensor data collected over fewer or more miles than 12,000 miles. The airbag activation data may be received from user input via a user interface. Alternatively, or in addition, the airbag activation data may be received from one or more external sensors, such as a vehicle sensor. As shown in FIG. 7, increasing the frame rate provides an increase in precision from approximately 35% recall through 90% recall, as demonstrated by the higher precision at those recall values for curve 708 compared to curve 706.

In addition to data used by TLE model used to produce curve 706 and curve 708, curve 710, which is represented by a long dashed line, supplements the sensor data, the vehicle make, model, and year, and airbag detection data with crash confirmation data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The airbag activation data may be received from user input via a user interface. Alternatively, or in addition, the airbag activation data may be received from one or more external sensors, such as a vehicle sensor. The crash confirmation data may be received from a user input via a user interface. For example, the crash confirmation data can be responses to survey questions provided by Total Loss Module 201 to a user (e.g., such as a driver or passenger) via a user interface of mobile device 104. As shown in FIG. 7, providing crash confirmation data to the TLE prediction model in addition to sensor data, vehicle data, and airbag activation data provides an increase in precision from approximately 35% recall through 95% recall, as demonstrated by the higher precision at those recall values for curve 710 compared to curve 706 and curve 708.

Figure 8:
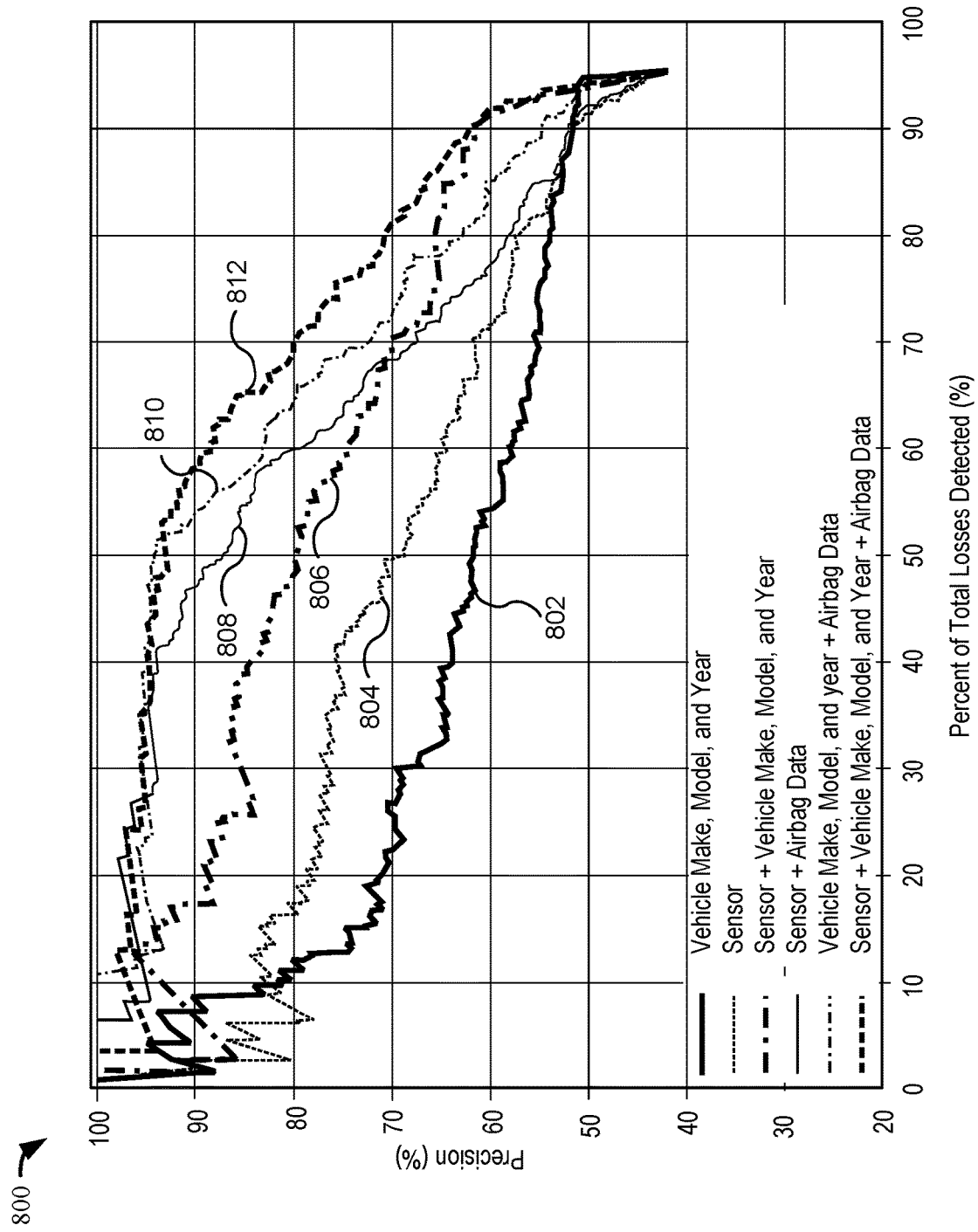
FIG. 8 is an example of a graph of results for predicting total loss events on detected crashes with confirmed crashes according to some embodiments.

FIG. 8 is an example of a graph 800 of results for predicting total loss events on detected crashes with confirmed crashes according to some embodiments. As illustrated in FIG. 8, graph 800 depicts plots of precision versus percentage of total loss predictions for a set of detected crashes. The ordinate of graph 800 represents the precision of the total loss predictions. As used herein, "precision" is a fraction of relevant instances (e.g., a vehicle crash) among the retrieved instances (e.g., true positives). The abscissa of graph 800 represents the recall. As used herein, "recall" is a fraction of the total amount of relevant instances that were actually retrieved (e.g., a measure of completeness). The TLE prediction model can use various combinations of input data as described above. For example, the input data may include sensor data, vehicle data, airbag activation data, and crash confirmation data, as described further herein.

In graph 800 illustrated in FIG. 8, precision varies based on the data inputs available to, and used by, the TLE prediction model. For example, curve 802, which is represented by a heavy solid line, illustrates the precision of total loss predictions generated using the TLE prediction model given inputs to the TLE prediction model of vehicle data only. Total loss module 201 may provide vehicle data to the TLE prediction model. Vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. As shown in FIG. 8, curve 802 illustrates that using only vehicle data as an input, the TLE model is able to achieve, at 50% recall, a precision of 63%.

As another example, curve 804, which is represented by a light dashed line, illustrates the precision of total loss predictions generated using the TLE prediction model given inputs to the TLE prediction model of outputs from driving sensors only. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. As shown in FIG. 8, curve 802 illustrates that using the outputs from driving sensors only, instead of vehicle data only, the TLE model is able to achieve, at 50% recall, a precision of approximately 70%.

Curve 806, which is represented by a heavy dash-dotted line, illustrates the precision of total loss predictions generated using the TLE prediction model using a combination of the outputs from driving sensors and the vehicle data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and barometers. Vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. As shown in FIG. 8, providing a combination of sensor data and vehicle data to the TLE prediction model provides an increase in precision from approximately 10% recall through 95% recall, as demonstrated by the higher precision at those recall values for curve 806 compared to curve 802 and curve 804. Further, curve 806 illustrates that using the outputs from driving sensors, the vehicle make, model and year, the TLE model is able to achieve, at 50% recall, a precision of 80%.

In addition to data used by TLE model used to produce curve 804, curve 808, which is represented by a light solid line, supplements the sensor data, with airbag detection data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The airbag activation data may be received from user input via a user interface. Alternatively, or in addition, the airbag activation data may be received from one or more external sensors, such as a vehicle sensor. As shown in FIG. 8, providing airbag activation data to the TLE prediction model in addition to sensor data provides an increase in precision from approximately 5% recall through 70% recall, as demonstrated by the higher precision at those recall values for curve 808 compared to curve 804. Further, curve 808 illustrates that using the outputs from driving sensors and airbag activation data, the TLE model is able to achieve, at 50% recall, a precision of 88%.

Similarly, in addition to data used by TLE model used to produce curve 802, curve 810, which is represented by a light dash-dotted line, supplements the vehicle data, with airbag detection data. Vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. The airbag activation data may be received from user input via a user interface. Alternatively, or in addition, the airbag activation data may be received from one or more external sensors, such as a vehicle sensor. As shown in FIG. 8, providing airbag activation data to the TLE prediction model in addition to vehicle data provides an increase in precision from approximately 10% recall through 92% recall, as demonstrated by the higher precision at those recall values for curve 810 compared to curve 802. Further, curve 810 illustrates that using the vehicle data and airbag activation data, the TLE model is able to achieve, at 55% recall, a precision of 88%.

Finally, curve 812, which is represented by a heavy dashed line, illustrates the precision of total loss predictions generated by the TLE prediction model using a combination of the sensor data, the vehicle data, and the airbag activation data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. The airbag activation data may be received from user input via a user interface. Alternatively, or in addition, the airbag activation data may be received from one or more external sensors, such as a vehicle sensor. As shown in FIG. 8, providing a combination of the sensor data, the vehicle data, and the airbag activation data to the TLE prediction model provides an increase in precision from approximately 52% recall through 92% recall, as demonstrated by the higher precision at those recall values for curve 812 compared to curve 808 and curve 810. Further, curve 812 illustrates that using the sensor data, the vehicle data, and airbag activation data, the TLE model is able to achieve, at 55% recall, a precision of 92%.

FIG. 9 is a table 900 of result data for predicting total loss events on confirmed crashes according to some embodiments. The table 900 is another view of the results illustrated by FIG. 8. Column 902 represents the prediction models used by the TLE prediction module for prediction total loss events. Columns 904 indicate the particular data provided to the prediction models. Columns 906 indicate the performance of the prediction model as a measure of precision at a recall value. As used herein, "precision" is a fraction of relevant instances (e.g., a vehicle crash) among the retrieved instances (e.g., true positives). As used herein, "recall" is a fraction of the total amount of relevant instances that were actually retrieved (e.g., a measure of completeness). The input data may include sensor data, vehicle data, and/or airbag activation data as well as any combination thereof.

FIG. 9 illustrates in tabular form that particular sets of data relating to a vehicle crash can provide results with varying amounts of precision when predicting a total loss confidence that a total loss event has occurred. For example, row 910 illustrates the precision of total loss predictions generated using the TLE prediction model given inputs to the TLE prediction model of vehicle data only. Total loss module 201 may provide vehicle data to the TLE prediction model. Vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. As shown in FIG. 9, row 910 illustrates that using only vehicle data as an input, the TLE model is able to achieve, at 50% recall, a precision of 63%.

As another example, row 912 illustrates the precision of total loss predictions generated using the TLE prediction model given inputs to the TLE prediction model of sensor data only. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. As shown in FIG. 9, row 912 illustrates that using the outputs from driving sensors only, instead of vehicle data only, the TLE model is able to achieve, at 50% recall, a precision of approximately 70%.

Row 914, illustrates the precision of total loss predictions generated using the TLE prediction model using a combination of the sensor data and the vehicle data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. Vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. As shown in FIG. 9, row 914 illustrates that using the outputs from driving sensors, the vehicle make, model and year, the TLE model is able to achieve, at 50% recall, a precision of 80%.

In addition to data used by TLE model used in row 912, row 916 supplements the sensor data, with airbag detection data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The airbag activation data may be received from user input via a user interface. Alternatively, or in addition, the airbag activation data may be received from one or more external sensors, such as a vehicle sensor. As shown in FIG. 9, row 916 illustrates that using the outputs from driving sensors and airbag activation data, the TLE model is able to achieve, at 50% recall, an increased precision of 88% compared to row 912.

Similarly, in addition to data used by TLE model used to produce row 910, row 918, which is represented by a light dash-dotted line, supplements the vehicle data, with airbag detection data. Vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. The airbag activation data may be received from user input via a user interface. Alternatively, or in addition, the airbag activation data may be received from one or more external sensors, such as a vehicle sensor. As shown in FIG. 9, row 918 illustrates that using the vehicle data and airbag activation data, the TLE model is able to achieve, at 55% recall, an increased precision of 88% compared to row 910.

Finally, row 920 illustrates the precision of total loss predictions generated by the TLE prediction model using a combination of the sensor data, the vehicle data, and the airbag activation data. The sensor data may include data received from one or more sensors of a mobile device, such as mobile device 104. The one or more sensors may include sensors such as global positioning system (GPS) receivers, accelerometers, magnetometers, gyroscopes, microphones, compasses, and/or barometers. The vehicle data may include one or more data types that correspond to vehicle-specific information. Examples of the data types of vehicle data include, but are not limited to, make, model, year of manufacture, trim packages (e.g., quality and features), previous accident history, vehicle identification number, previous insurance claims on the vehicle, vehicle maintenance records, combinations thereof, and the like. The airbag activation data may be received from user input via a user interface. Alternatively, or in addition, the airbag activation data may be received from one or more external sensors, such as a vehicle sensor. As shown in FIG. 9, Further, row 920 illustrates that using the sensor data, the vehicle data, and airbag activation data, the TLE model is able to achieve, at 55% recall, an increased precision of 92% compared to row 916 and row 918.

While FIG. 9 illustrates a specific group of input sets, other machine-learning models can be trained to use additional data types for total loss prediction based on other data relating to the vehicle crash that is made available. For instance, while it is not shown in FIG. 9, using training operating parameters of the vehicle, such as steering wheel position, headlight setting, windshield wiper setting, brake pedal position, and the like can be used to train additional models to provide additional confidences that the total loss event occurred.

Figure 10:
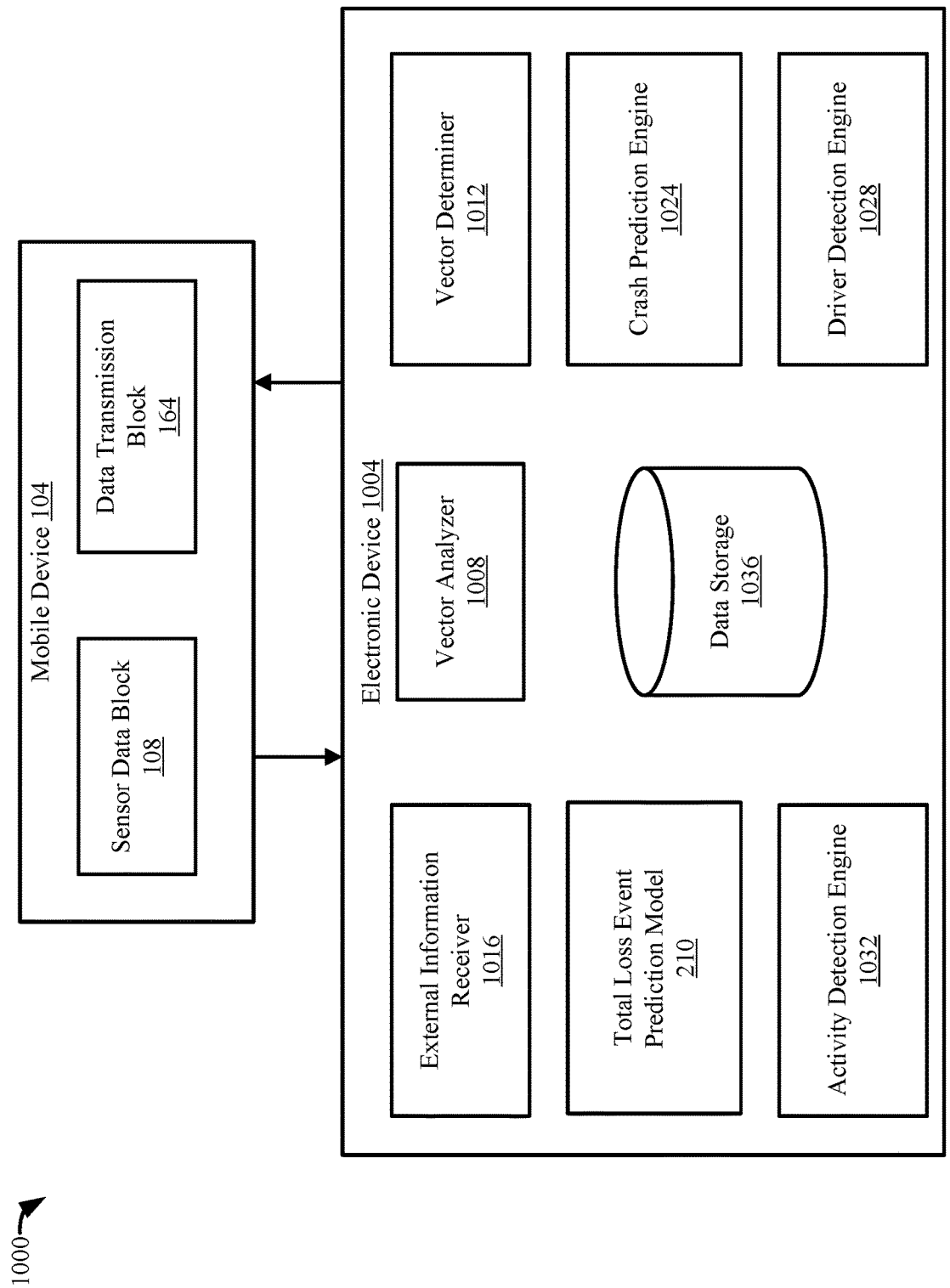
FIG. 10 is a block diagram of a system for predicting a confidence of a total loss event according to some embodiments.

FIG. 10 is a block diagram of a system 1000 for predicting a confidence of a total loss event according to some embodiments. System 1000 may include electronic device 1004, which may be incorporated within mobile device 104 (e.g., as specialized hardware or software) or may be a separate device (or execute on a separate device) that communicates with the mobile device 104. For instance, as a separate device, electronic device 1004 may be a mobile device (e.g., such as mobile device 104 of FIG. 1, a similar type of mobile device, a different type of mobile device, or the like), a server, a computing device such as desktop or laptop computer, a specialized processing device (e.g., such as one or more application specific integrated circuits, field programmable gate arrays, or the like), a distributed processing system (e.g., such a cloud environment or the like), a combination thereof (e.g., as a distributed process), or the like. In some embodiments, the electronic device 1004 may provide functionality using components including, but not limited to: a vector analyzer 1008, a vector determiner 1012, an external information receiver 1016, a TLE prediction model 210 (e.g., a machine-learning model), a crash prediction engine 1024, a driver detection engine 1028, and activity detection engine 1032. Each component may include one or more processors (not shown) and memory (not shown). Instructions stored in the memory of a component may be executed by the one or more processors of the component to configure and/or otherwise provide the functionality of the component. Alternatively, one or more processors of electronic device 1004 (not shown) may execute instructions stored in a central memory of electronic device 1004 that configure and/or otherwise cause the system to provide the functionality of the components. The electronic device 1004 may also include a data storage 1036. In some instances, one or more of the components operating on electronic device 1004 may be stored in memory 152 or storage 156 of mobile device 104 and/or executed by processor 148 of mobile device 104.

One or more sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle and during a drive. In that instance, the one or more sensors may be operated while the mobile device is positioned proximate to a driver during a time interval that corresponds to when the driver is operating the vehicle. As used herein, the terms a "drive" and a "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information etc.) can be retrieved and correlated with collected driving data.

In some embodiments, a display of a mobile device (such as mobile device 104) can show representations of driving data collected by the one or more sensors or generated by any of the components of electronic device 1004. For instance, representations of driving data can be generated by transforming collected sensor data (e.g., driving data collected using sensor data block 108) into different results, including, but not limited to, estimates of an activity of a user of mobile device 104 (e.g., stationary, walking, running, driving, etc.), estimates of the occurrence of different driving events during a drive for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments.

Sensor data (e.g., collected using the sensor data block 108) may be used to analyze movement of the mobile device to detect the occurrence of driving events. The sensor data may be aggregated by electronic device 1004 and analyzed once a predetermined amount of the sensor data is received. For example, once the electronic device 1004 aggregates 50 megabytes of sensor data, the electronic device 1004 may initiate an analysis of the sensor data. In another example, the electronic device 1004 may initiate an analysis of the sensor data once electronic device 1004 receives sensor data collected over a predetermined interval (e.g., a half hour of sensor data, an hour of sensor data, etc.). In still yet another example, the electronic device 1004 aggregates sensor data associated with a drive and analyzes the sensor data once all of the sensor data associated with the trip is received. Alternatively, mobile device 104 includes one or more components of electronic device 1004 and provides analysis of sensor data in real time (e.g., as the one or more sensors obtain measurements).

A GPS receiver may provide time stamped location and speed data that can be used by various applications executing on the mobile device. The time stamped data can be used to accurately determine vehicle location and speed. The GPS receiver may detect a crash and determine distance traveled by the vehicle. For instance, the GPS receiver may detect a crash by detecting sudden changes in speed or location. However, since mobile devices operate with limited resources due to power and processing constraints and due to the high power consumption of operating a GPS receiver, electronic device 1004 may use the one or more other sensors of mobile device 104 to detect vehicle location and/or speed.

For instance, a mobile device positioned in a vehicle experiences mechanical vibrations related to the activity of the vehicle. These vibrations are measurable using a subset of the sensors in the sensor data block 108 of mobile device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 116 may be a three-axis accelerometer operable to measure longitudinal and lateral acceleration as well as acceleration due to gravity. The gyroscope 124 and the magnetometer 120 may also be three axis devices and may measure angular rotation and magnetic heading, respectively, in three dimensions. The IMU may combine the three-dimensional accelerometer data with the three-dimensional gyroscopic data to identify movement of the mobile device with six degrees of freedom (e.g., translation and rotation).

During a drive with a mobile device positioned in a vehicle, the IMU of the mobile device may be used to obtain movement measurements from any of the accelerometer, the gyroscope, and the magnetometer, and the movement measurements to generate an input for a crash prediction engine 1024 to predict a crash. In some instances, the acceleration measurements may be used by TLE prediction model 210 may include significant changes (e.g., deviations from a typical drive or braking event) in acceleration.

The movement measurement signals from the IMU sensors may be sampled at a specified sampling rate to obtain digital signals. In some instances, a 9 Hz sampling rate may be used for the movement measurement signals. In other instances, a 30 Hz sampling rate may be used for the movement measurement signals. Other sampling rates, for example, 50 Hz or another sampling rate may be used. Higher sampling rates can provide improved speed estimation at the cost of increased resource consumption (e.g., processing and/or power resources). Electronic device 1004 and/or mobile device 104 may modulate IMU sensor sampling in real time to optimize the volume of data collected (e.g., for accuracy of data analysis) and the resource consumption.

Activity detection engine 1032 detects an activity that corresponds to sensor measurements received from the one or more sensors of sensor data block 108. For instance, the activity detection engine 1032 detects when mobile device 104 is stationary, with a user who is walking, with a user who is running, in a vehicle that is driving, in a vehicle that is flying, and the like. In some instances, activity detection engine 1032 outputs a probability of the activity. In those instances, activity detection engine 1032 may output more than one probability such as a 45% probability that the mobile device is walking and a 33% probability that mobile device is driving, and 22% probability of some other activity. The probability may be expressed as an integer or real number, a percentage, a grade (such as a low, medium, or high), or in another mechanism configured to represent the probability of a given activity.

Activity detection engine 1032 may use the activity to detect drives from sensor data. For instance, activity detection engine 1032 may analyze the data received from mobile device 104 and identify a first time when the activity indicates a high probability that mobile device 104 is in a car that is driving. Activity detection engine 1032 may initiate execution of the total loss module based on the determination that a drive is in progress. Other components of electronic device 1004 may then further analyze the sensor data received during the drive to identify driver behavior, driver score, crash detection, etc. In some instances, this may be performed by an operating system of the mobile device to control data collection by sensor data block 108.

In some instances, activity detection engine 1032 may operate on mobile device 104 to control collection of measurements from sensor data block 108. Mobile device 104 may execute a total loss module that controls the operation of the one or more sensors of mobile device 104 (e.g., such as sampling rates and the like) and collects measurements from the one or more sensors. The total loss module can include one or more of the components of electronic device 1004. Since the mobile device operates with limited resources, the total loss module may be suspended, run in the background, or terminated while the mobile device is at rest or not during a drive. Activity detection engine 1032 may operate in a background process to detect if a drive is occurring. If a drive is occurring, activity detection engine 1032 may cause the total loss module to be initiated and begin collection of sensor data associated with the drive. In some instances, activity detection engine 1032 may generate a geofence around mobile device 104. If mobile device 104 crosses the geofence, then activity detection engine 1032 may cause the total loss module to be initiated. For instance, the geofence may surround a user's house such that when the geofence is crossed it is likely due to the user initiating a drive. The geofence may be generated after a period of inactivity. The geofence may be generated a predetermined distance from the mobile such that when the mobile crosses the geofence it is likely due to the beginning of a drive rather than through other activity such as walking. Other detectable events may be used to initiate the total loss module such as, but not limited to, a visit, other notification, time interval, one or more sensor measurements exceeding threshold, or the like.

As previously described, activity detection engine 1032 may obtain the sensor measurements that were collected by the operating system (or another application) of the mobile device and generate a probability of an activity associated with the mobile device. Alternatively, this may be performed by the operating system itself. For instance, the operating system may output a probability that mobile device 104 is stationary, walking, running, driving, flying, or the like. Activity detection engine 1032 may then request the sensor data collected by the operating system during an event associated with a driving activity. The sensor data collected by the operating system may be added to any sensor data collected by the total loss module (e.g., using driving sensors 202).

For example, activity detection engine 1032, detects that mobile device 104 crossed a geofence and initiates execution of a total loss module to begin collection of sensor measurements such as IMU sensors. The total loss module then requests sensor data from the operating system for a time interval prior to when the mobile device crossed the geofence. This enables mobile device 104 to capture sensor measurements over the entire duration of the drive despite the total loss module executing and beginning collecting sensor measurements a few minutes into the drive.

In another example, when the total loss module is executed, it requests from the operating system of mobile device 104 over a time interval prior to execution of the total loss module. Immediately following initial execution, the total loss module identifies from driving sensors that a drive is in progress. The total loss module then requests the sensor data collected by the operating of the mobile device 104 preceding the execution of the total loss module. In some instances, there may be a delay between when the drive begins and the operating system detects that a drive activity is occurring.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements that configure a system to operate as designed. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory and later used to configure the system upon execution of the instructions. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices and/or other machine readable mediums for storing information. The term "computer-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method comprising:
    operating, by an application executing on a mobile device, one or more sensors of the mobile device while the mobile device is positioned within a vehicle during a drive to collect movement measurements indicative of movements of the vehicle;
    detecting, by the application using the movement measurements as the movement measurements are collected, a change in the movements of the vehicle that exceeds a predefined threshold indicative of an occurrence of a vehicle collision;
    identifying, by the application in response to detecting the change in the movements of the vehicle that exceeds the predefined threshold, a first set of data from the movement measurements, wherein the first set of data includes a portion of the movement measurements collected over a time interval that begins at a first time before the change in the movements and ends at a second time after the change in the movements;
    generating, by the application, a first feature vector using the first set of data and vehicle data, wherein the vehicle data includes an identifier of the vehicle;
    generating, by the application, a second feature vector using the first feature vector and a first predefined value for an additional data type of one or more additional data types;
    generating, by the application, a third feature vector using the second feature vector, the third feature vector including a second predefined value for the additional data type that is different from the first predefined value;
    executing, by the application, a first machine-learning model on the first feature vector to generate a first confidence value;
    executing, by the application, a second machine-learning model on the second feature vector to generate a second confidence value;
    executing, by the application, the second machine-learning model on the third feature vector to generate a third confidence value;
    determining, by the application, that a conflict exists between the first confidence value, the second confidence value, and the third confidence value;
    obtaining, by the application, and in response to determining that the conflict exists, an actual value for the additional data type from a user of the mobile device or an external device;
    executing, by the application, the second machine-learning model with the actual value for the additional data type to generate a confidence of a total loss event; and
    presenting, by the application, the confidence of the total loss event to the user of the mobile device or a remote computing system.

2. The method of claim 1, wherein generating the first feature vector comprises:
    extracting a set of crash features from the first set of data, wherein the set of crash features represent sensor data of the vehicle at a time when the change in the movements of the vehicle occurred;

extracting a set of vehicle features from the vehicle data; and combining the set of crash features and the set of vehicle features.

3. The method of claim 1, wherein the total loss event is associated with a determination that the vehicle sustained a damage level during the crash event the change in the movements of the vehicle that is greater than a value of the vehicle.

4. The method of claim 1, wherein the one or more additional data types include an airbag activation data type.

5. The method of claim 1 wherein the one or more additional data types includes a fluid leakage indicator.

6. The method of claim 1, wherein obtaining the actual value for the additional data type comprises:

outputting, via a user interface of the mobile device, a request for the actual value; and receiving, via the user interface, and in response to the request, one or more inputs including the actual value.

7. A mobile device comprising:

one or more sensors;

one or more processors; and a non-transitory computer-readable medium storing instructions which, when executed by the one or more processors, cause the mobile device to:

operate the one or more sensors while the mobile device is positioned within a vehicle during a drive to collect movement measurements indicative of movements of the vehicle;

detect, using the movement measurements, and as the movement measurements are collected, a change in the movements of the vehicle that exceeds a predefined threshold indicative of an occurrence of a vehicle collision;

identify, in response to detecting the change in the movements of the vehicle that exceeds the predefined threshold, a first set of data from the movement measurements, wherein the first set of data includes a portion of the movement measurements collected over a time interval that begins at a first time before the change in the movements and ends at a second time after the change in the movements;

generate a first feature vector using the first set of data and vehicle data, wherein the vehicle data includes an identifier of the vehicle;

generate a second feature vector using the first feature vector and a first predefined value for an additional data type of one or more additional data types;

generate a third feature vector using the second feature vector, the third feature vector including a second predefined value for the additional data type that is different from the first predefined value;

execute a first machine-learning model on the first feature vector to generate a first confidence value;

execute a second machine-learning model on the second feature vector to generate a second confidence value;

execute the second machine-learning model on the third feature vector to generate a third confidence value;

determine that a conflict exists between the first confidence value, the second confidence value, and the third confidence value;

obtain, in response to determining that the conflict exists, an actual value for the additional data type from a user of the mobile device or an external device;

execute the second machine-learning model with the actual value for the additional data type to generate a confidence of a total loss event; and present the confidence of the total loss event to the user of the mobile device or a remote computing system.

8. The system of claim 7, wherein generating the first feature vector further comprises:

extracting a set of crash features from the first set of data, wherein the set of crash features represent sensor data of the vehicle at a time when the crash event the change in the movements of the vehicle occurred;

extracting a set of vehicle features from the vehicle data; and combining the set of crash features and the set of vehicle features.

9. The system of claim 7, wherein the total loss event is associated with a determination that the vehicle sustained a damage level during the change in the movements of the vehicle that is greater than a value of the vehicle.

10. The system of claim 7, wherein the one or more additional data types include an airbag activation data type.

11. The system of claim 7, wherein the one or more additional data types include a fluid leakage indicator.

12. The system of claim 7, wherein the instructions further cause the mobile device to obtain the actual value for the additional data type by:

outputting, via a user interface of the mobile device, a request for the actual value; and receiving, via the user interface, and in response to the request, one or more inputs including the actual value.

13. A non-transitory computer-readable medium storing instructions which, when executed by one or more processors of a mobile device, cause the one or more processors to perform operations comprising:

operating one or more sensors of the mobile device while the mobile device is positioned within a vehicle during a drive to collect movement measurements indicative of movements of the vehicle;

detecting, using the movement measurements, and as the movement measurements are collected, a change in the movements of the vehicle that exceeds a predefined threshold indicative of an occurrence of a vehicle collision;

identifying, in response to detecting the change in the movements of the vehicle that exceeds the predefined threshold, a first set of data from the movement measurements, wherein the first set of data includes a portion of the movement measurements collected over a time interval that begins at a first time before the change in the movements and ends at a second time after the change in the movements;

generating a first feature vector using the first set of data and vehicle data, wherein the vehicle data includes an identifier of the vehicle;

generating a second feature vector using the first feature vector and a first predefined value for an additional data type of one or more additional data types;

generating a third feature vector using the second feature vector, the third feature vector including a second predefined value for the additional data type that is different from the first predefined value;

executing a first machine-learning model on the first feature vector to generate a first confidence value;

executing a second machine-learning model on the second feature vector to generate a second confidence value;

executing the second machine-learning model on the third feature vector to generate a third confidence value;

determining that a conflict exists between the first confidence value, the second confidence value, and the third confidence value;

obtaining, in response to determining that the conflict exists, an actual value for the additional data type from a user of the mobile device or an external device;

executing the second machine-learning model with the actual value for the additional data type to generate a confidence of a total loss event; and presenting the confidence of the total loss event to the user of the mobile device or a remote computing system.

14. The non-transitory computer-readable medium of claim 13, wherein generating the first feature vector comprises:

extracting a set of crash features from the first set of data, wherein the set of crash features represent sensor data of the vehicle at a time when the change in the movements of the vehicle occurred;

extracting a set of vehicle features from the vehicle data; and combining the set of crash features and the set of vehicle features.

15. The non-transitory computer-readable medium of claim 13, wherein the one or more additional data types include an airbag activation data type.

16. The non-transitory computer-readable medium of claim 13, wherein the one or more additional data types include a fluid leakage indicator.

17. The non-transitory computer-readable medium of claim 13, wherein obtaining the actual value for the additional data type comprises:

outputting, via a user interface of the mobile device, a request for the actual value; and receiving, via the user interface, and in response to the request, one or more inputs including the actual value.

* * * * *